(12) United States Patent
LaBelle

(10) Patent No.: US 7,508,497 B2
(45) Date of Patent: Mar. 24, 2009

(54) RANGEFINDER WITH REDUCED NOISE RECEIVER

(75) Inventor: John LaBelle, Long Beach, CA (US)

(73) Assignee: Meade Instruments Corporation, Irvine, CA (US)

( * ) Notice: Subject to any disclaimer, the term of this patent is extended or adjusted under 35 U.S.C. 154(b) by 332 days.

(21) Appl. No.: 10/995,687

(22) Filed: Nov. 23, 2004

(65) Prior Publication Data

US 2005/0110976 A1     May 26, 2005

Related U.S. Application Data

(60) Provisional application No. 60/525,621, filed on Nov. 26, 2003.

(51) Int. Cl.
   *G01C 3/08* (2006.01)
(52) U.S. Cl. ..................... 356/5.01; 356/5.07
(58) Field of Classification Search ........ 356/5.01–5.15
   See application file for complete search history.

(56) References Cited

U.S. PATENT DOCUMENTS

| | | |
|---|---|---|
| 3,325,750 A | 6/1967 | O'Hern et al. |
| 3,652,161 A | 3/1972 | Ross |
| 3,832,056 A | 8/1974 | Shipp et al. |
| 4,105,332 A | 8/1978 | Hohne et al. |
| 4,131,791 A | 12/1978 | Lego, Jr. |
| 4,226,529 A | 10/1980 | French |
| 4,259,592 A | 3/1981 | Frungel et al. |
| 4,356,457 A | 10/1982 | Di Carlo |
| 4,453,825 A | 6/1984 | Buck et al. |
| 4,527,894 A | 7/1985 | Goede et al. |
| 4,564,818 A | 1/1986 | Jones |
| 4,606,629 A | 8/1986 | Hines et al. |
| 4,609,880 A | 9/1986 | Dermitzakis et al. |
| 4,620,788 A | 11/1986 | Giger |
| 4,770,526 A | 9/1988 | Manhart et al. |

(Continued)

OTHER PUBLICATIONS

Meade Instruments Corporation, "Laser Rangefinder with Speedgun," Weaver catalog, p. 14, published on or around Feb. 3, 2003.

(Continued)

*Primary Examiner*—Thomas H Tarcza
*Assistant Examiner*—Timothy A Brainard
(74) *Attorney, Agent, or Firm*—Knobbe, Martens, Olson & Bear, LLP

(57) ABSTRACT

A rangefinder and method are provided for measuring a distance between the rangefinder and a target by measuring the flight time of a beam reflected from the target. In an embodiment, a receiver having reduced noise detects weak reflections from the targets or targets with poor reflectivity. The receiver generates a voltage signal proportional to a reflected beam, clamps the voltage signal to remove a portion of the noise therefrom, and compares the voltage signal to a threshold. In some embodiments, the receiver also filters the voltage signal to remove a portion of the noise therefrom. In an embodiment, the sensitivity of the receiver is increased as a function of time to reduce the likelihood of detecting stray reflections from objects other than the intended target. In some embodiments, the rangefinder collects calibration data with each range measurement or group of range measurements. The calibration data comprise a plurality of simulated range measurements.

20 Claims, 12 Drawing Sheets

U.S. PATENT DOCUMENTS

| | | | |
|---|---|---|---|
| 4,801,893 A | 1/1989 | Perandi | |
| 4,914,402 A | 4/1990 | Dermitzakis et al. | |
| 4,959,535 A | 9/1990 | Garrett | |
| 5,010,588 A | 4/1991 | Gimlett | |
| 5,046,839 A | 9/1991 | Krangle | |
| 5,087,808 A | 2/1992 | Reed | |
| 5,221,956 A | 6/1993 | Patterson et al. | |
| 5,291,200 A | 3/1994 | Lo | |
| 5,291,262 A | 3/1994 | Dunne | |
| 5,359,404 A | 10/1994 | Dunne | |
| 5,363,064 A | 11/1994 | Mikamura | |
| 5,418,609 A | 5/1995 | Dunne | |
| 5,521,555 A | 5/1996 | Tazartes et al. | |
| 5,521,696 A | 5/1996 | Dunne | |
| 5,528,518 A | 6/1996 | Bradshaw et al. | |
| 5,539,513 A | 7/1996 | Dunne | |
| 5,574,552 A | 11/1996 | Dunne | |
| 5,612,779 A | 3/1997 | Dunne | |
| 5,623,335 A | 4/1997 | Bamberger | |
| 5,652,651 A | 7/1997 | Dunne | |
| 5,696,705 A | 12/1997 | Zykan | |
| 5,703,678 A | 12/1997 | Dunne | |
| 5,715,045 A | 2/1998 | Dunne | |
| 5,780,999 A | 7/1998 | Dunne | |
| 5,781,147 A | 7/1998 | Elliott et al. | |
| 5,790,244 A | 8/1998 | Dunne | |
| 5,806,020 A | 9/1998 | Zykan | |
| 5,859,693 A | 1/1999 | Dunne et al. | |
| 5,880,821 A | 3/1999 | Dunne | |
| 5,889,583 A | 3/1999 | Dunne | |
| 5,898,484 A | 4/1999 | Harris | |
| 5,926,259 A | 7/1999 | Bamberger et al. | |
| 5,926,260 A | 7/1999 | Dunne et al. | |
| 5,933,224 A | 8/1999 | Hines et al. | |
| 5,938,717 A | 8/1999 | Dunne et al. | |
| 5,946,081 A | 8/1999 | Lai et al. | |
| 5,949,529 A | 9/1999 | Dunne et al. | |
| 5,978,393 A | 11/1999 | Feldman et al. | |
| 6,023,322 A * | 2/2000 | Bamberger | 356/5.01 |
| 6,043,868 A | 3/2000 | Dunne | |
| 6,057,910 A * | 5/2000 | Dunne | 356/5.05 |
| 6,064,330 A | 5/2000 | Elliott et al. | |
| 6,226,077 B1 | 5/2001 | Dunne | |
| 6,292,501 B1 | 9/2001 | DuBose | |
| D453,301 S | 2/2002 | Vermillion | |
| 6,377,186 B1 | 4/2002 | Dunne et al. | |
| D458,555 S | 6/2002 | Vermillion | |
| 6,444,970 B1 | 9/2002 | Barbato | |
| 6,445,444 B2 * | 9/2002 | Dunne | 356/5.01 |
| D470,785 S | 2/2003 | Vermillion | |
| 6,650,404 B1 * | 11/2003 | Crawford | 356/5.01 |
| 6,677,569 B2 * | 1/2004 | Beusch | 250/208.1 |
| 6,683,558 B1 | 1/2004 | Vermillion | |
| 6,897,465 B2 * | 5/2005 | Remillard et al. | 250/559.38 |
| 7,031,685 B2 * | 4/2006 | Ohashi | 455/234.1 |
| 7,047,054 B2 * | 5/2006 | Benni | 600/323 |
| 2001/0012104 A1 | 8/2001 | Dunne | |
| 2003/0085284 A1* | 5/2003 | Bremer et al. | 235/462.32 |
| 2004/0015289 A1 | 1/2004 | Poland et al. | |
| 2004/0027275 A1 | 2/2004 | Vermillion | |
| 2005/0041985 A1* | 2/2005 | Seetharaman et al. | 398/202 |

OTHER PUBLICATIONS

Donald G. Baker, "Fiber Optic Design and Applications," Reston Publishing Co., Inc., pp. 144-186, 1985.

Merrill I. Skolnik, "Introduction to Radar Systems," McGraw-Hill Book Co., pp. 388-398.

User Manual, "Pro Laser II Infrared Lidar System," Kustom Signals, Inc., 1991.

Sales Sheets, "Pro Laser II," Kustom Signals, Inc., Feb. 1994.

Operator's Manual, "Marksman LTI 20-20 Laser Speed Detection System," Laser Technology, Inc. 1994.

* cited by examiner

RANGEFINDER WITH REDUCED NOISE RECEIVER

RELATED APPLICATIONS

This application claims a priority benefit under 35 U.S.C. §119(e) from U.S. Provisional Patent Application No. 60/525,621, filed on Nov. 26, 2003. The foregoing application is hereby incorporated by reference herein.

BACKGROUND OF THE INVENTION

1. Field of the Invention

The present invention relates to a rangefinder device for measuring a distance to a target.

2. Description of the Related Art

Rangefinders are used to measure distances to targets. Typically, a rangefinder will emit a beam of energy towards a target and detect a reflected beam from the target. In general, the rangefinder measures the time interval between the emission of the transmitted beam and the reception of the reflected beam. This time interval is referred to herein as the "flight time." The distance from the rangefinder to the target is derived from the speed of the beam and the flight time.

It can be difficult for conventional receivers to detect a reflected beam because the strength of the reflected beam becomes weaker as a function of distance to the target. Further, factors such as rain, snow, shrubbery, targets with poor reflectivity, or the like can reduce the strength of the reflected beam.

The ability of a rangefinder to detect a reflected beam from a target depends at least in part on the sensitivity of the rangefinder's receiver. In general, the magnitude of the received signal should be larger than the noise present in the receiver in order to be detected. Receiver noise is typically generated by, for example, a photodiode used to detect the reflected beam, receiver electronics used to amplify a signal from the photodiode, background light received along with the reflected beam, or the like. Background light is typically the largest source of noise during daylight operation of laser rangefinders. Such noise reduces the signal-to-noise ratio and makes it difficult to detect weak reflections.

While detection depends at least in part on the receiver's sensitivity, a receiver that is too sensitive can generate a false detection of the reflected beam. False detection may be caused, for example, by reflections from objects that are not the intended target such as shrubs, trees, snow, rain, or other objects in the path between the intended target and the rangefinder. Weak reflections from such objects can cause an overly sensitive receiver to incorrectly determine that a beam reflected from the intended target has been received. However, as discussed above, if the sensitivity is too low, valid reflections from distant targets or targets with poor reflectivity cannot be detected.

The accuracy of range measurements is affected by the rangefinder's ability to accurately measure a beam's flight time because small variations can create significant errors in the distance calculated. Often, capacitor discharge mechanisms are used to create a more manageable representation of the flight time. Even using such discharging mechanisms, delays in the rangefinder's internal circuitry add additional error to flight time interval measurements.

Some errors caused by the internal circuitry are due to inherent delays that can be initially measured and corrected during, for example, factory calibration and test. However, some delays caused by the internal circuitry are variable and may change over time. Further, some delays may change with variations in environmental conditions such as temperature, humidity and the like.

SUMMARY OF THE INVENTION

Thus, it would be advantageous to develop a technique and system for increasing a rangefinder receiver's sensitivity by reducing receiver noise. It would also be advantageous to avoid false detection of reflected energy beams from a target by changing the sensitivity of the receiver as a function of time. Further, it would be advantageous to develop a technique and system for calibrating range measurements using data collected each time a rangefinder acquires a range measurement or a set of range measurements. It would also be advantageous to develop a technique and system to correct range measurement errors related to dynamic factors, such as errors that vary with time or environmental conditions.

Embodiments of the present invention provide a rangefinder and method for measuring distances by measuring the flight time of an energy pulse traveling between the rangefinder and a target. The rangefinder includes a low noise receiver that receives the energy pulse and converts it into a voltage pulse that is compared to a threshold voltage level. In an embodiment, the voltage pulse is filtered, amplified, and clamped to remove noise and improve the signal-to-noise ratio. In an embodiment, the sensitivity of the receiver is increased as a function of time to reduce the likelihood of detecting stray reflections from objects other than the intended target. Moreover, in various embodiments, false detections are reduced by ignoring reflections until a predetermined amount of time has passed, incrementally changing the threshold voltage level, using a time-varying waveform to automatically lower the threshold voltage as a function of time, combinations of the foregoing, or the like.

In addition, or in other embodiments, the present invention provides a rangefinder and method for calibrating a target range measurement. In such embodiments, a rangefinder performs a calibration each time a range measurement is taken. The rangefinder collects an uncalibrated range measurement by measuring the flight time of an energy or light beam as it travels to and from a target. The rangefinder automatically generates calibration data by simulating range measurements. The rangefinder uses the calibration data to correct measurement errors and outputs a calibrated range measurement.

According to the foregoing, an embodiment includes a rangefinder configured to determine a range to a target by measuring a flight time of a beam traveling between the rangefinder and the target. The rangefinder includes a transmitter configured to emit the beam towards the target, a receiver configured to detect a reflection of the beam from the target, and a processor configured to convert the flight time of the beam into a range measurement. The receiver includes a photodiode configured to generate a current signal proportional to the received reflection, a transimpedance amplifier configured to receive the current signal and to generate a voltage signal proportional thereto, noise reduction circuitry configured to reduce noise present in the voltage signal by limiting the voltage signal relative to a first voltage level, and a comparator configured to indicate when the voltage signal exceeds a second voltage level.

In an embodiment, a method is provided for detecting a reflected beam received from a target. The method includes generating a voltage signal proportional to the reflected beam and removing a first portion of noise from the voltage signal. The method further includes comparing the voltage signal to a first voltage level to detect the reflected beam. The first voltage level is above a second portion of the noise present in the voltage signal. The method also includes indicating that the voltage signal is at least as great as the first voltage level.

In an embodiment, a rangefinder receiver includes means for generating a voltage signal proportional to a beam reflected from a target, means for removing noise from the voltage signal, and means for comparing the voltage signal to a first voltage level.

In an embodiment, a receiver includes a photodiode, a transimpedance amplifier, noise reduction circuitry, and an adjustable threshold. The photodiode is configured to generate a current signal proportional to a received light pulse. The transimpedance amplifier is configured to receive the current signal and to generate a voltage signal proportional thereto. The voltage signal comprises noise and a voltage pulse proportional to the light pulse. The noise reduction circuitry is configured to remove noise present in the voltage signal. The threshold is adjustable in a search pattern.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A system and method which embodies the various features of the invention will now be described with reference to the following drawings.

DETAILED DESCRIPTION OF THE PREFERRED EMBODIMENT

Figure 1:
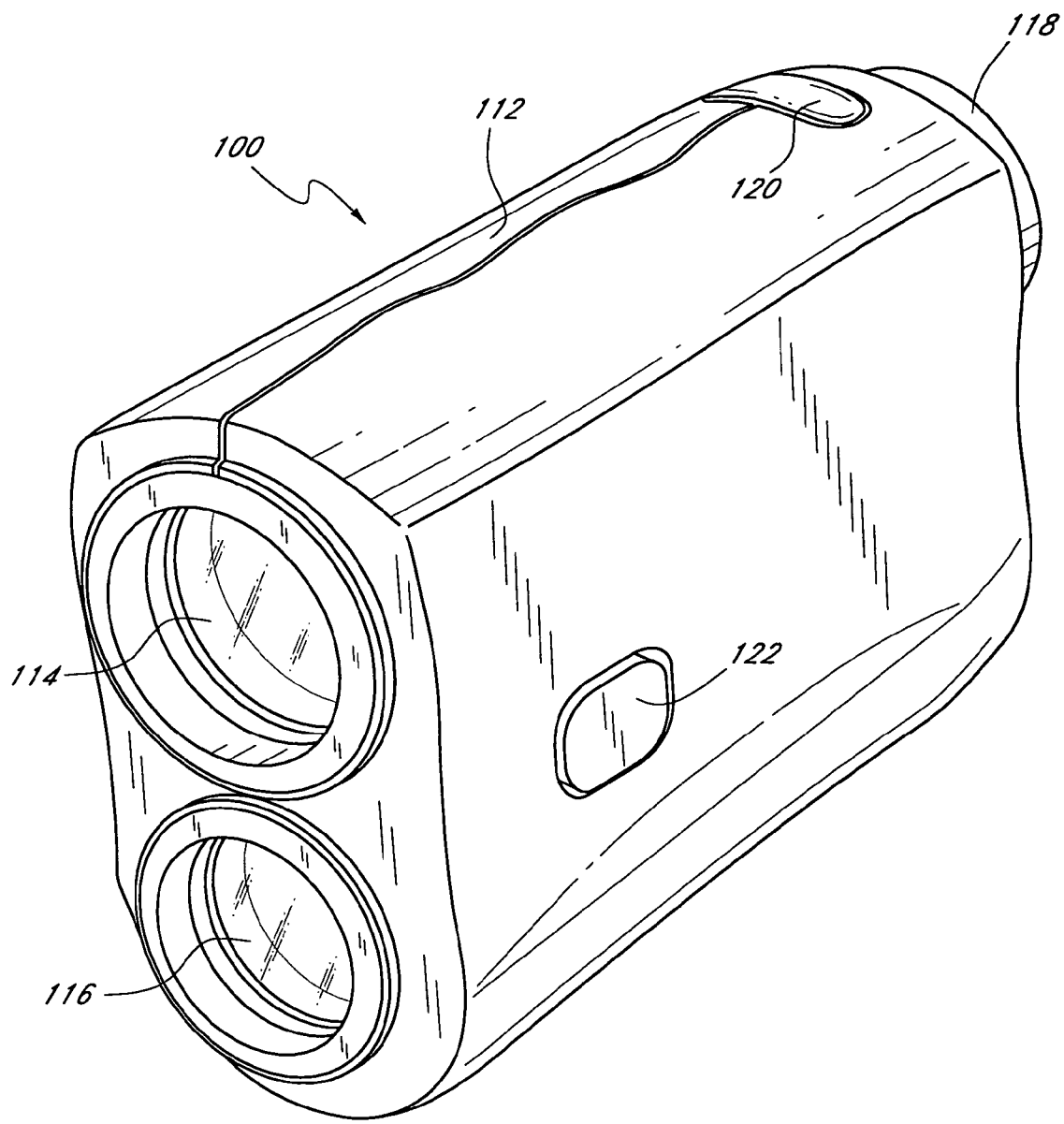
FIG. 1 is a perspective view of an exemplary laser rangefinder according to an embodiment of the invention.

Aspects or embodiments of the present invention provide a method and rangefinder for measuring a distance between the rangefinder and a target. A rangefinder according to the invention emits an energy pulse towards a target and detects a reflection of the energy pulse from the target. The rangefinder measures an elapsed time between emitting the energy pulse and detecting the energy pulse and, based on the speed of the emitted and reflected energy pulse, converts the elapsed time into a distance measurement.

According to one aspect of the rangefinder system, a receiver with reduced noise is used to detect weak reflections from distant targets or targets with poor reflectivity. In an embodiment, a rangefinder receiver filters, amplifies and clamps a receiver signal comprising receiver noise and a pulse proportional to a light pulse reflected from a target. The receiver removes low frequency noise components generated by a photodiode configured to receive the reflected beam, and also removes background light noise components generated by the photodiode.

In an embodiment, the receiver removes constant voltage components, sets the mean voltage signal level to approximately zero volts, and removes the negative portion of the receiver signal. Thus, in the embodiment, the receiver removes substantially half of the random noise present in the receiver signal. The receiver also removes high frequency noise components generated, in part, when amplifying the receiver signal.

According to another aspect of the rangefinder system, the sensitivity of the receiver is increased as a function of time to reduce the likelihood of detecting stray reflections from objects other than the intended target. In an embodiment, ignoring reflections until a predetermined amount of time has passed reduces false detection. In an embodiment, the sensitivity of the receiver is advantageously set low and incrementally increased until a valid target is detected. In addition, or in other embodiments, a time-varying waveform is used to automatically increase the receiver's sensitivity as a function of time to detect strong signals from nearby targets and weak signals from increasingly more distant targets.

According to another aspect of the rangefinder system, the rangefinder system performs a calibration each time a range measurement is taken. In an embodiment of the rangefinder system, a raw or uncalibrated range measurement is collected when a user triggers the rangefinder. Alternatively, multiple uncalibrated range measurements are collected when the user triggers the rangefinder. Collecting an uncalibrated range measurement involves measuring the flight time of a beam as it is transmitted to a target and reflected back to the rangefinder system.

Once the uncalibrated range measurement is collected, the rangefinder system of the present invention automatically generates calibration data. Alternatively, the calibration data is generated when the user triggers the rangefinder, before the uncalibrated range measurements are collected. Preferably, the calibration data is generated in relation to the time that the uncalibrated range measurement is collected so as to determine measurement errors related to dynamic factors, such as errors that vary with time or environmental conditions.

In an embodiment, calibration data is generated by simulating range measurements. During a simulated range measurement, the rangefinder system measures a known flight time and calculates a measurement error based on the difference between the measured flight time and the known flight time. The rangefinder system calibrates the uncalibrated range measurement by correcting for the calculated measurement error. The rangefinder system then provides the calibrated range measurement to the user.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

FIG. 1 is a perspective view of an exemplary laser rangefinder 100 according to an embodiment of the invention. The laser rangefinder 100 comprises a housing 112, user optics 114, laser optics 116, a display 118, a power or trigger actuator 120 and a mode selector 122. In an embodiment, the laser rangefinder 100 is portable and is configured to be held in a user's hand while taking range measurements. For example, the rangefinder 100 may be used in nature watching, such as bird watching, sports such as golf, shooting, hunting, construction such as surveying, or the like.

Although described with reference to a handheld monocular rangefinder, an artisan will recognize from the disclosure herein that the rangefinder 100 may be a binocular device, camera, gun, sighting device, other optical device, or the like. The laser rangefinder 100 may be mounted on a moveable or fixed surface or stand such as a pole, tripod or the like.

Figure 2:
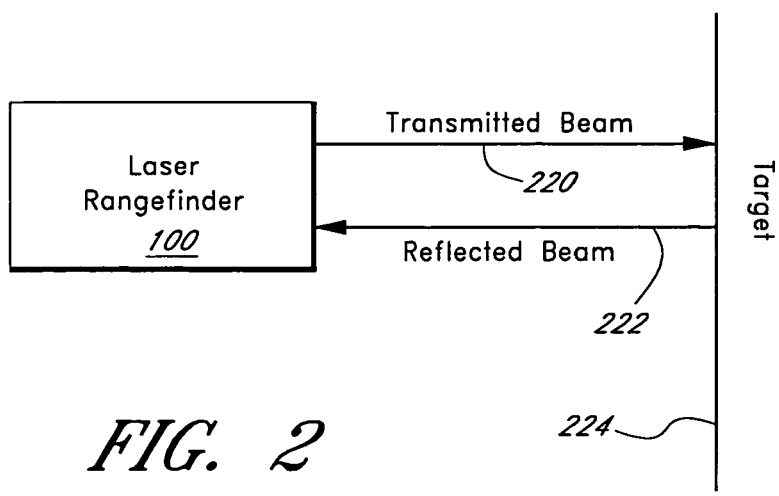
FIG. 2 is an exemplary block diagram illustrating a range determination process usable by the rangefinder of FIG. 1.

FIG. 2 is an exemplary block diagram illustrating a range determination process usable by the rangefinder 100 of FIG. 1. Referring to FIGS. 1 and 2, the display 118 and user optics 114 are used to align the laser optics 116 with a remote target 224. Pressing the trigger actuator 120 causes the laser rangefinder 100 to emit a laser beam 220 toward the remote target 224 through the laser optics 116. In an embodiment, the transmitted laser beam 220 can comprise a pulsed laser beam. The laser rangefinder 100 is configured to detect a reflected laser beam 222 from the target 224 through the laser optics 116. The laser rangefinder 100 is configured to measure the flight time of the transmitted laser beam 220 and the reflected laser beam 222, and to calculate a range from the laser rangefinder 100 to the target 224. In an embodiment, the range is based on the measured flight time (often divided by two) and the speed of the transmitted and reflected laser beams 220, 222. For example, taking the speed of the transmitted and reflected laser beams to be about 0.98357 feet per nanosecond, the range to the target may be calculated in equation (1) as:

$$\text{Range} = 0.98357 \text{ (feet/nanosecond)} \times \text{(flight time (nanoseconds)}/2) \quad (1)$$
$$= 0.49178 \text{ (feet/nanosecond)} \times \text{flight time (nanoseconds)},$$

where 0.98357 feet per nanosecond represents the speed of light in a vacuum and is provided for exemplary reasons only and is not intended to limit or construe the disclosure or claims. In fact, an artisan will recognize from the disclosure herein many possible light, sound or other energy beam speeds that can be used.

As discussed in detail hereinbelow, an embodiment of the laser rangefinder 100 is configured to calibrate a raw or uncalibrated range measurement derived from equation (1) to account for errors introduced by internal circuitry delays, aging, and environmental changes.

The display 118 comprises a monocular eyepiece coupled to the user optics 114. Alternatively, the display 118 can comprise binocular eyepieces wherein each eyepiece is coupled to separate user optics (not shown) or to the same user optics 114. As another alternative, the display 118 may comprise a video display such as a liquid crystal display (LCD) screen or the like. Additionally, or alternatively, an artisan will recognize from the disclosure herein a variety of techniques for allowing a user to effectively aim the rangefinder 100 at one or more potential remote targets.

Figure 3:
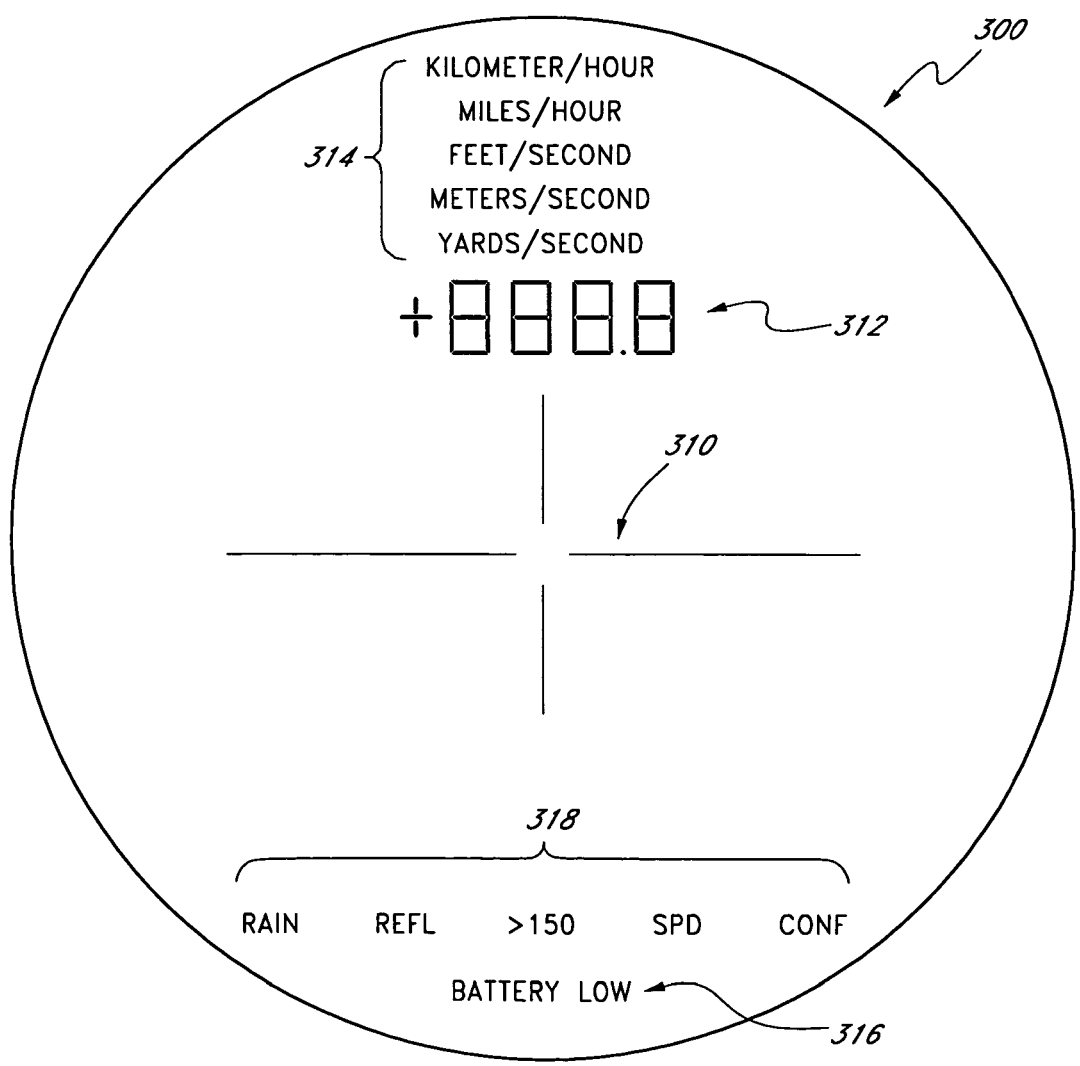
FIG. 3 is an exemplary illustration of a display of the rangefinder of FIG. 1.

FIG. 3 is an exemplary illustration of a user display 300 of the rangefinder 100 of FIG. 1. The user display 300 is visible, for example, when looking at or through the display 118 shown in FIG. 1. The user display 300 can comprise targeting indicia 310 configured to aid a user when aligning the laser optics 116 with a remote target (not shown). Thus, in one embodiment, the user display 300 comprises a transparent background that allows the user to see both the target and the targeting indicia 310.

In an embodiment, the user display 300 also comprises range and speed indicia 312 and corresponding active unit indicia 314 configured to display the distance to or speed of a remote target. In an embodiment, a user may select the units in which to display a measurement and the corresponding units will be displayed in the active unit indicia 314. For example, speed may be displayed as kilometers/hour, miles/hour, or the like and distance may be displayed as feet, meters, yards, or the like. The user may select the units in which to display the range/speed indicia 312 by, for example, pressing the mode selector 122 shown in FIG. 1 a predetermined number of times or for a predetermined length of time.

The user display 300 may also comprise a power indicator 316 and mode indicators 318. In one embodiment, the power indicator 318 is displayed when a low battery condition exists. The mode indicators 316 display the current mode of the laser rangefinder which may be selected by pressing the mode selector 122 shown in FIG. 1. For example, "RAIN" is displayed when rain mode is selected to remove the effects of rain, snow and flying insects from the range measurement, ">150" is displayed when long range mode is selected to suppress reflections from objects such as bushes and trees that are between the rangefinder and a distant target (e.g., a target greater than 150 yards away), "SPD" is displayed when speed mode is selected to measure the speed of a target, and "CONF" is displayed when configuration mode is selected to configure the rangefinder (e.g., to configure the displayed units). In one embodiment, the mode indicators 318 comprise a reflection signal strength indicator "REFL" which is displayed when a strong target reflection signal is detected. Alternatively, the reflection signal strength indicator REFL may comprise a gauge or a bar graph which indicates the relative strength of the detected target reflection signal.

Although discussed with reference to one or more embodiments visible through the user optics of the rangefinder 100, an artisan will recognize from the disclosure herein a number of alternatives for the user display 300 of FIG. 3. For example, the user display 300 may comprise an attached or detached viewable display, such as those associated with, for example, camcorders, laptops, cell phones, personal digital assistants (PDAs), other computing devices, or the like. Also, the rangefinder 100 may include communication mechanisms, such as a signal output, that communicates with one or more of the foregoing devices in a wired or wireless manner. Thus, the rangefinder 100 can be configured to transmit range data to an external device or system for further processing or display. For example, the rangefinder 100 may be configured to transmit range information to a system configured to adjust the location of targeting indicia, such as cross-hairs or the like, in a scope or other siting device based on the range information. In an alternative embodiment, the rangefinder 100 is configured to provide an audible indication of range information through, for example, a loudspeaker, headphones, or the like. In addition, the rangefinder 100 may include communication mechanisms providing for remote operation, such as in use with a webcam or the like.

Figure 4:
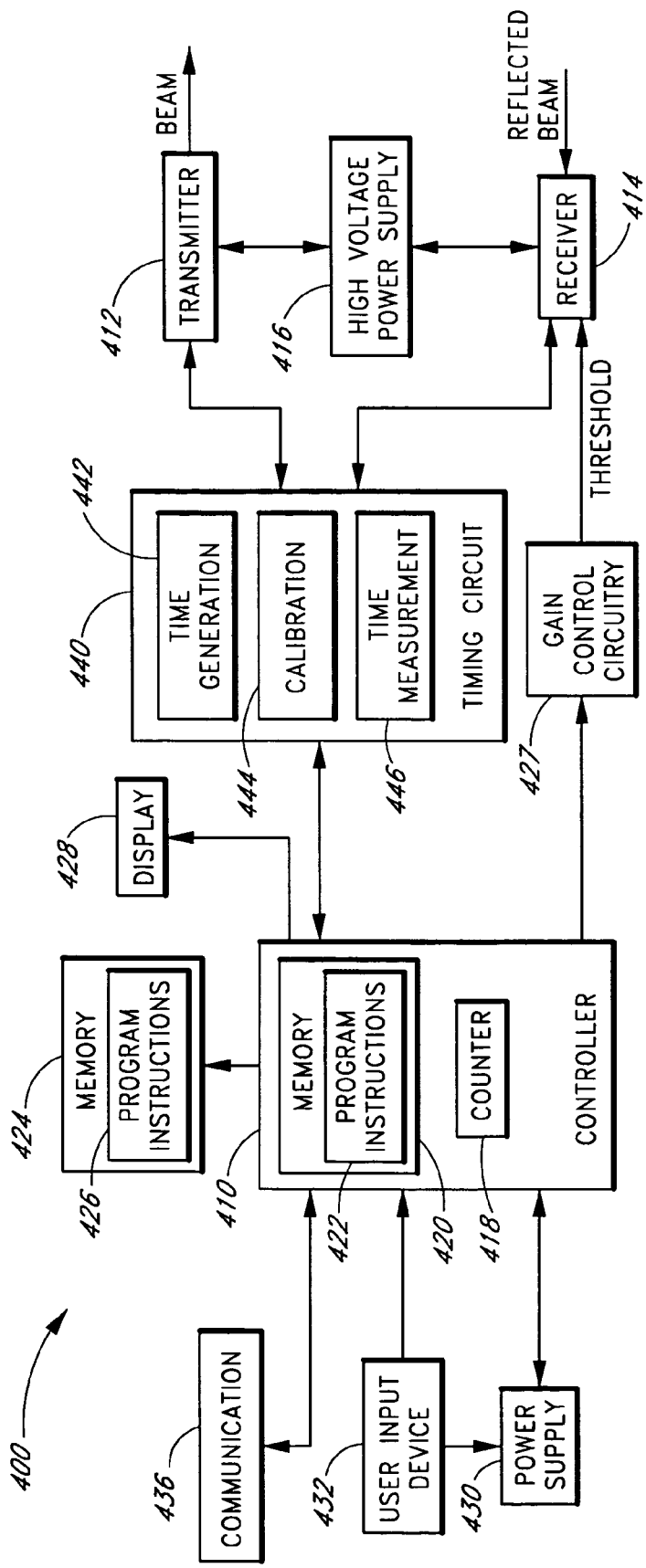
FIG. 4 is a block diagram illustrating a rangefinder system according to an embodiment of the invention.

FIG. 4 is a block diagram illustrating a rangefinder system 400 according to an embodiment of the invention. The rangefinder system 400 comprises a controller 410 coupled to a transmitter 412 and a receiver 414 through timing circuitry 440. The transmitter 412 is configured to emit a laser beam and the receiver 414 is configured to detect a reflection of the emitted laser beam. In an embodiment, the transmitter 412 and the receiver 414 can be coupled to a high voltage power supply 416.

In an embodiment, the receiver 414 is configured to receive a reflection of the laser beam emitted by the transmitter 412, generate a voltage signal proportional to the reflected laser beam, and reduce the noise present in the voltage signal. In an embodiment, the noise present in the voltage signal is reduced by filtering the voltage signal to remove low frequency noise components, high frequency noise components, or both. In addition, or in other embodiments, clamping the voltage signal at a predetermined voltage level reduces the noise present in the voltage signal.

The receiver 414 is also configured to detect when a valid reflection of the laser beam is received. In an embodiment, the sensitivity of the receiver 414 is adjusted over time to detect weak signals from distant targets or targets with poor reflectivity. For accurate measurements when measuring targets known or suspected to be further away than a predetermined distance (e.g., greater than 150 yards from the rangefinder system 400), the receiver 414 can ignore detected laser beam reflections for a predetermined period of time after the transmitter emits a laser beam. The receiver 414 may also ignore reflections that arrive sooner than expected due to, for example, shrubbery, rain, snow, or the like. For example, the receiver 414 may output a signal indicating receipt of a reflected beam when the received reflected beam comprises one or more characteristics such as signal strength above a predetermined threshold. When the receiver 414 is set for accurate measurements that ignore weaker reflections from objects other than the intended target (e.g., shrubs, etc.), the threshold will be set to a higher voltage level. A high threshold level may be suitable, for example, for short-range measurements where the receiver 414 receives a relatively strong reflected laser beam from a nearby target with high reflectivity.

The strength of the reflected laser beam is reduced by a factor of approximately the distance squared to the target. Therefore, to detect weak signals from increasingly distant targets or targets with low reflectivity, gain control circuitry 427 is configured to increase the receiver sensitivity from a low sensitivity (i.e., a high threshold level) to a high sensitivity (i.e., a low threshold level). As discussed in more detail below, in some embodiments the gain control circuitry superimposes a decreasing waveform on the threshold level to automatically decrease the threshold level as a function of time.

In one embodiment, the gain control circuitry comprises a digital-to-analog converter (DAC) (not shown) configured to control the threshold level. The controller 410 includes a pulse-width modulated timer system configured to drive the DAC to generate a threshold voltage at the desired threshold level. Although the gain control circuitry 427 is shown external to the controller 410, an artisan will recognize from the disclosure herein that the gain control circuitry 427 can also be part of the controller 410.

For accurate range measurements in an embodiment, the rangefinder system 400 attempts to detect the reflected laser beam using high threshold levels. Thus, in an embodiment, the rangefinder system 400 enters a target acquisition mode wherein the controller 410 sets the threshold voltage generated by the DAC to a predetermined high level after the transmitter 412 emits the laser beam. If the reflection is not detected, the controller 410 reduces the threshold voltage until a reflected laser beam is detected. In an embodiment, the controller 410 adjusts the threshold in a search pattern until a reflected laser beam is detected.

By way of example only, and not by limitation, in an exemplary embodiment the controller 410 uses twelve bits to adjust the threshold voltage generated by the DAC in the gain control circuitry 427 between approximately zero and 2.5 volts. The controller 410 attempts to detect a reflected laser beam by performing a binary or other search algorithm. The controller 410 starts the binary search by setting the DAC to the highest threshold level used in the search (e.g., approximately 2.5 volts) and adjusts the threshold level according to the search algorithm until a reflected laser beam is detected.

Once a reflected laser beam is detected, the rangefinder system 400 records one or more range measurements corresponding to a distance to the target. In an embodiment, a plurality of range measurements are taken and processed to determine the range to the target. Statistical operations, calibration corrections, or both, are performed on the plurality of range measurements to remove outlying values and increase the accuracy of the overall range measurement. An artisan will recognize from the disclosure herein that the statistical operations can advantageously include a wide variety of analysis directed to increasing the accuracy of the rangefinder system 400 including, for example, removing the highest and lowest values, calculating the standard deviation, averaging the plurality of range measurements or a portion thereof, combinations of the foregoing, or the like. In an exemplary embodiment, approximately ten to sixteen range measurements are taken and processed to determine a distance to a target. If the target is lost (i.e., a reflected laser beam can no longer be detected) while taking the plurality of range measurements, the controller 410 decreases the threshold voltage generated by the DAC in the gain control circuitry 427 until a reflected laser beam is detected or until a predetermined number of failed attempts to detect the target are made.

The controller 410 comprises, by way of example, one or more processors, program logic, hardware, software, or other substrate configurations capable of representing data and instructions which operate as described herein or similar thereto. The controller 410 may also comprise controller circuitry, processor circuitry, processors, general purpose single-chip or multi-chip microprocessors, digital signal processors, embedded microprocessors, microcontrollers, combinations of the foregoing, or the like. The controller 410 further comprises a counter 418. In an alternative embodiment, the counter 418 is external to the controller 410.

Although an artisan will recognize from the disclosure herein that a sufficiently fast microcontroller can advantageously be used to directly or otherwise "time" or count the flight time of the transmitted beam.

In one embodiment, the controller 410 also includes an internal memory device 420 comprising, for example, random access memory (RAM). The controller can also be coupled to an external memory device 424 comprising, for example, drives that accept hard and floppy disks, tape cassettes, CD-ROM or DVD-ROM. The internal memory device 420 or the external memory device 424, or both, can comprise program instructions 422, 426 for controlling the timing circuitry 440, transmitting and receiving laser beams, storing data including range measurements and calibration data, performing statistical analysis on the measured data, adjusting the sensitivity of the receiver 414, and calibrating measured data as described herein.

In an embodiment, the controller 410 is coupled to a display 428, a communication device 436, a user input device 432, and a power supply 430. In one embodiment, the display 428 is an LCD screen attached to the rangefinder system 400 configured to display a target and, for example, some or of the indicia and indicators discussed above with respect to FIG. 3. As disclosed in the foregoing, other embodiments of the display 428 include, for example, an optical viewfinder for locating a target and a separate digital display for indicating a range or speed to the target, a detachable video monitor such as a cathode ray tube (CRT), an LCD superimposed on an optical viewfinder, or the like. The communication device 436 is configured to provide communication with external systems and devices and can comprise, for example, a serial port, a parallel port, a universal serial bus (USB) controller, or an Internet or other network adapter. The user input device 432 can include, for example, a keypad, a mouse, user buttons such as the trigger actuator 120, the mode selector 122 shown in FIG. 1, or any device that allows a user to enter data into the controller 410.

According to some embodiments, the timing circuitry 440 comprises a time generation section 442, a calibration section 444 and a time measurement section 446. The time generation section 442 is configured to correlate the start of a timing parameter (not shown) with the transmission of a laser pulse by the transmitter 412. The time generation section 442 is configured to initiate the timing parameter and to command the transmitter 412 to emit a laser pulse in response to a transmit signal (not shown) received from the controller 410. The timing parameter can comprise, for example, a physical parameter stored as a function of time, such as a charge stored in a capacitor, or the like. Alternatively, the timing parameter can comprise, for example, a time value generated or stored by a counter, a timer, or the like.

The calibration section 444 is configured to remove errors in uncalibrated range measurements due to internal circuitry delays, aging, and environmental conditions such as temperature, humidity and the like. In an embodiment, the calibration section 444 is configured to simulate one or more range measurements by ignoring the reflected laser pulse and stopping the timing parameter at predetermined calibration times. The calibration section 444 corrects range measurement errors by correlating uncalibrated range measurements with the one or more simulated range measurements to create a calibrated range. In an embodiment, the calibration section 444 simulates one or more range measurements each time an uncalibrated range measurement is collected. Alternatively, the calibration section 444 simulates one or more range measurements each time a set of uncalibrated range measurements is collected.

The time measurement section 446 is configured to correlate the timing parameter with a flight time of a transmitted and reflected laser pulse. In an embodiment, the time measurement section 446 is configured to stop the timing parameter in response to a reflected laser pulse detected by the receiver 414 and to measure the timing parameter. The measured timing parameter corresponds to a flight time measurement between transmission of the laser pulse by the transmitter 412 and detection of the laser pulse by the receiver 414. In an embodiment, the time measurement section 446 is configured to stop the timing parameter at a predetermined calibration time and to measure a timing parameter corresponding to a simulated range measurement.

Figure 5:
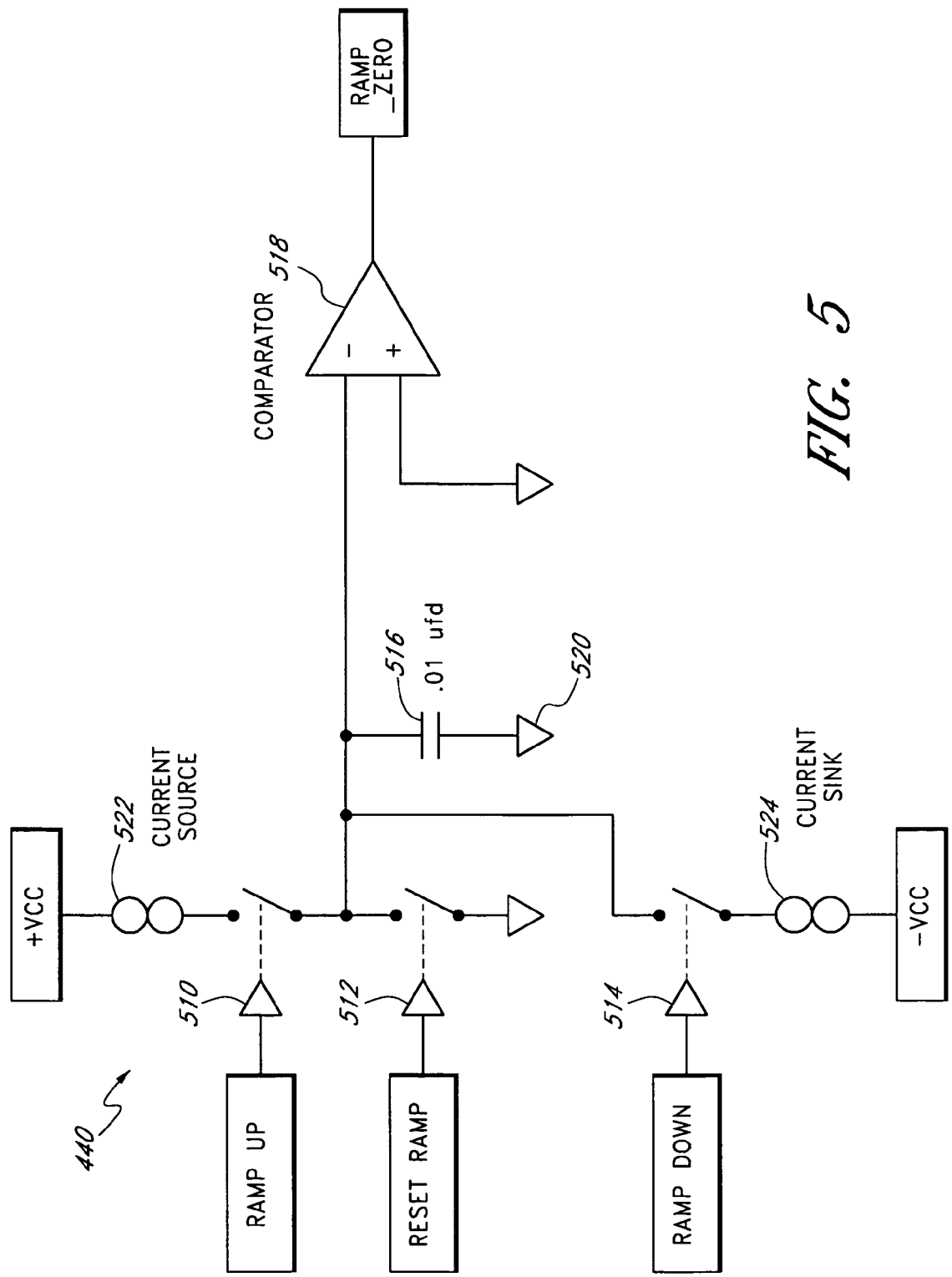
FIG. 5 is a simplified schematic of an exemplary timing circuit according to an embodiment of the invention.

FIG. 5 is a simplified schematic of an exemplary timing circuit 440 according to an embodiment of the invention. In the illustrated exemplary embodiment, the timing circuitry 440 comprises three switches 510, 512, 514 coupled to a capacitor 516 at an input of a comparator 518. The capacitor 516 is coupled between the "−" input terminal of the comparator 518 and a circuit ground 520. The "+" input terminal of the comparator 518 is coupled to circuit ground 520.

The switch 510 is configured to switch the capacitor 516 to a charging signal +VCC through a current source 522 in response to a "Ramp Up" signal. The switch 512 is configured to switch the capacitor 516 to the circuit ground 520 in response to a "Reset Ramp" signal. The switch 514 is configured to switch the capacitor 516 to a discharging signal −VCC through a current sink 524 in response to a "Ramp Down" signal.

The exemplary timing circuitry 440 operates in a time generation and measurement mode. In an embodiment, the time generation and measurement mode is initialized by setting a counter, such as the counter 418 shown in FIG. 4, to zero and discharging the capacitor 516 by opening the switches 510, 514 and closing the switch 512. Time generation is started by opening the switch 512, commanding a transmitter, such as the transmitter 412 shown in FIG. 4, to emit a laser pulse and closing the switch 510. With the switch 510 closed, the current source 522 begins to charge the capacitor 516. In an exemplary embodiment, the capacitor 516 is a 0.01 µF capacitor and the current source 522 is a 5 mA current source. Thus, as a function of time, the charge on the capacitor 516 increases or "ramps up" at approximately +0.5 volts per microsecond, which is approximately 0.001 volts per foot of target range. An artisan will recognize from the disclosure herein that other values for the capacitor 516 and current source 522 can be used or that other charge and discharge times can be used to measure target range.

Upon detection of a reflected laser pulse, the switch 510 is opened to stop charging the capacitor 516. The flight time is measured by closing the switch 514 and starting the counter 418. With the switch 514 closed, the current sink 524 begins to discharge the capacitor 516 while the counter 418 accumulates counts. In an exemplary embodiment, the capacitor 516 is a 0.01 µF capacitor, the current sink 524 is a 2.5 µA current sink, and the counter 418 is a sixteen bit counter that accumulates counts from a 500 kHz time base (not shown). Thus, as a function of time, the charge on the capacitor 516 decreases or "ramps down" at −0.25 volts per millisecond, which is approximately two counts per foot of target range.

When the charge on the discharging capacitor 516 is equal to or less than circuit ground 520, the comparator 518 provides a "Ramp_Zero" signal. In response to the Ramp_Zero signal, the switch 514 is opened and the counter 418 is stopped from accumulating any more counts. The value in the counter 418 comprises an uncalibrated flight time measurement that is converted into an uncalibrated range measurement using, for example, the method discussed above in relation to equation (1), the statistical analysis discussed above, combinations of the same, or the like. At least one of the uncalibrated flight time measurement and uncalibrated range measurement is stored. In an embodiment, a plurality of uncalibrated range measurements are generated before performing analysis on the plurality of uncalibrated range measurements, such as calibrating the range measurements.

Figure 6:
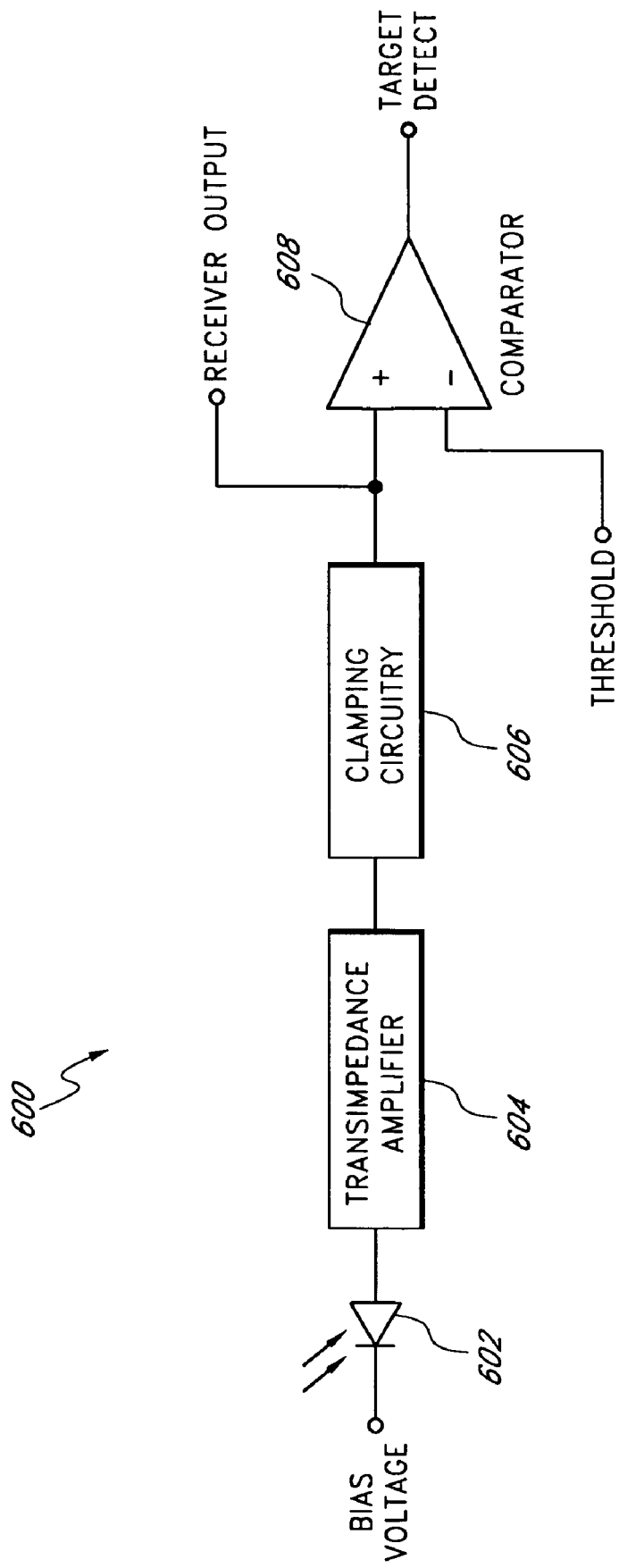
FIG. 6 is a block diagram illustrating a low noise receiver according to an embodiment of the invention.

FIG. 6 is a block diagram illustrating a receiver 600 according to an embodiment of the invention. The receiver 600 comprises a photodiode 602, a transimpedance amplifier 604, clamping circuitry 606, and a comparator 608. The photodiode 602 is configured to receive a pulsed beam reflected from a target. In an embodiment, optics (not shown), such as one or more lenses or the like, are configured to direct the received beam to a detection surface of the photodiode 602.

The cathode of the photodiode 602 is coupled to a "bias voltage" signal configured to bias the photodiode 602 so as to conduct current when illuminated by the received beam. By way of example and not limitation, the current generated by the photodiode 602 may be on the order of approximately tens of nanoamperes or less when receiving a detectable beam.

The transimpedance amplifier 604 is configured to receive the current generated by the photodiode 602 and to generate an amplified voltage signal proportional thereto. The voltage signal includes a pulse that is proportional to the magnitude of the received beam and noise. The noise present in the voltage signal is due to factors such as noise generated by the photodiode 602, noise from background light received by the photodiode 602, noise generated by the transimpedance amplifier 604, combinations of the foregoing, or the like.

In an embodiment, the transimpedance amplifier 604 provides the voltage signal to the clamping circuitry 606. The clamping circuitry 606 is configured to reduce the noise present in the voltage signal by limiting the voltage signal relative to a predetermined voltage level. For example, in one embodiment, the clamping circuitry 606 centers the voltage signal around a predetermined voltage level through, for example, an average magnitude function or the like. Then, pulses below the predetermined voltage level are clipped or removed from the voltage signal. In other embodiments, pulses above the predetermined voltage level are clipped or removed from the voltage signal.

A positive terminal of the comparator 608 is configured to receive the voltage signal from the clamping circuitry 606. The voltage signal from the clamping circuitry 606 is also provided as a "receiver output" signal that indicates the strength of the received beam. The receiver output signal may, for example, be displayed to a user, stored, transmitted to an external device or system, processed, combinations of the foregoing, or the like. A negative terminal of the comparator 608 is configured to receive a "threshold" signal. The comparator 608 is configured to generate a "target detect" signal when the clamped voltage signal on the positive terminal is greater than or equal to the threshold signal on the negative terminal. Thus, a valid beam is detected when the pulse that is proportional to the magnitude of the received beam reaches or exceeds the threshold signal.

To detect the pulse that is proportional to the magnitude of the received beam, the threshold signal is set above the noise level of the voltage signal. Thus, by reducing the noise present on the voltage signal with the clamping circuitry 606, the threshold signal can be set to a lower voltage level. This allows weaker reflected beams to be detected and improves the sensitivity of the receiver 600. As discussed above, false detection of beams reflected from a target are reduced by setting the threshold signal at a high level and lowering the threshold signal towards the voltage signal until the pulse that is proportional to the magnitude of the received beam is detected. Alternatively, rather than linearly reducing the threshold signal, a search algorithm (e.g., a binary search or the like) may be used. Alternatively, although not shown, an automatic time varying gain function may be applied by superimposing a decreasing waveform on the threshold signal.

Figure 7:
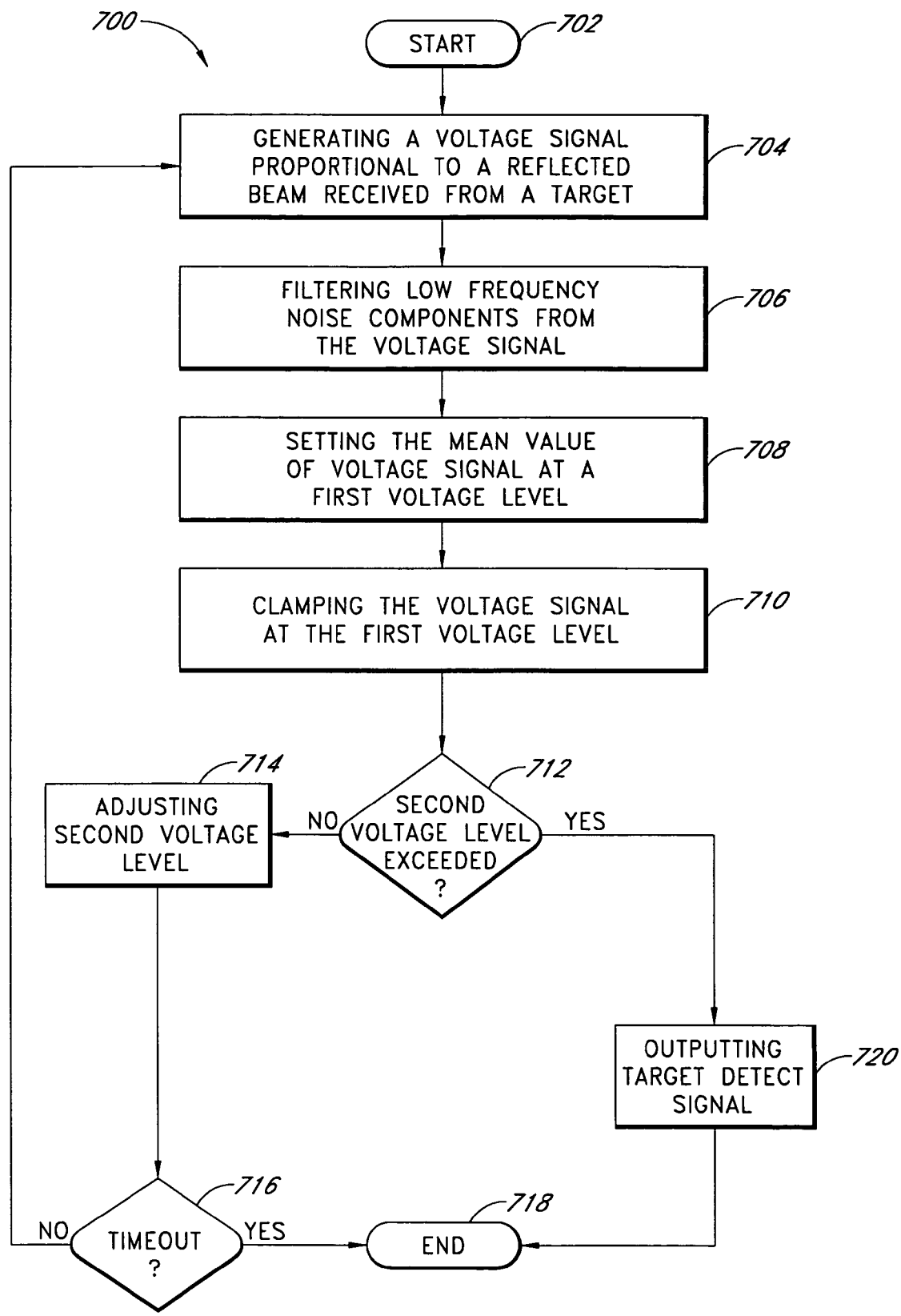
FIG. 7 is a flow chart illustrating portions of an exemplary target detection process usable by a rangefinder receiver according to an embodiment of the invention.

FIG. 7 is a flow chart illustrating portions of an exemplary target detection process 700 usable by a rangefinder receiver according to an embodiment of the invention. In an embodiment, the target detection process 700 includes, in short, filtering noise, adjusting the mean value of the noise, and removing portions of the noise below the mean value. Thus, the signal-to-noise ratio of the receiver is increased and the sensitivity is improved.

The process 700 includes a block 704 where the rangefinder 100 generates a voltage signal proportional to a reflected beam received from a target. The voltage signal includes noise and information corresponding to the reflected beam. In block 706, the rangefinder 100 filters low frequency noise components from the voltage signal. The low frequency noise components include components at a lower frequency than the information contained in the voltage signal. Filtering the low frequency noise components also removes constant voltage components from the voltage signal.

Noise caused by background light, receiver electronics, or the like generally has a very broad spectrum of frequency components. Thus, in addition or in other embodiments, the target detection process 700 includes filtering high frequency noise components from the voltage signal. The high frequency components include components at a higher frequency than the information contained in the voltage signal. Thus, the filtering does not remove the information corresponding to the reflected beam. Accordingly, an artisan will recognize from the disclosure herein that the present disclosure encompasses no filtering, low frequency filtering, high frequency filtering, band-pass filtering, combinations of the same, or the like.

In block 708, the process 700 includes setting the mean value of the voltage signal at a first voltage level. In an embodiment, the first voltage level corresponds to ground or approximately zero volts. However, an artisan will recognize from the disclosure herein that other voltages can be used. In block 710, the rangefinder 100 clamps the voltage signal at the first voltage level. Since the mean value of the voltage signal is set to the first voltage level, clamping the voltage signal at the first voltage level removes approximately half the voltage signal. As discussed in more detail below, clamping the voltage signal does not remove the information contained therein corresponding to the reflected beam.

In block 712, the rangefinder 100 queries whether the voltage signal exceeds a second voltage level. More particularly, the rangefinder 100 determines whether the information corresponding to the reflected beam indicates that a valid beam has been received by the rangefinder. If the voltage signal is not greater than the second voltage level, the rangefinder 100 adjusts the second voltage level in block 714. Adjusting the second voltage level allows weaker reflected beams to be detected. Also, false detection of beams reflected from objects other than the intended target are reduced by setting the second voltage level high and lowering it for successive target detection attempts until a reflected beam is detected.

In block 716, the rangefinder 100 queries whether a timeout has occurred. The timeout may correspond, for example, to a predetermined time after a beam is first transmitted by the rangefinder. Alternatively, the timeout may correspond, for example, to a failed number of attempts to detect a reflected beam from a target. If the timeout has occurred, the process 700 in block 718 ends. If the timeout has not occurred, the process 700 returns to block 704 where the rangefinder 100 attempts to acquire the target using the adjusted second voltage level.

In block 712, if the rangefinder 100 determines that the voltage signal is greater than the second voltage level, the rangefinder 100 in block 720 outputs a target detect signal to indicate that the reflected beam has been detected. The process 700 then ends in block 718. Thus, the target detection process 700 shown in FIG. 7 improves signal-to-noise ratio and sensitivity by filtering noise, adjusting the mean value of the noise, and removing portions of the noise below the mean value. In other embodiments, the mean value of the noise is not adjusted and the noise is clamped at a predetermined voltage level.

Figure 8:
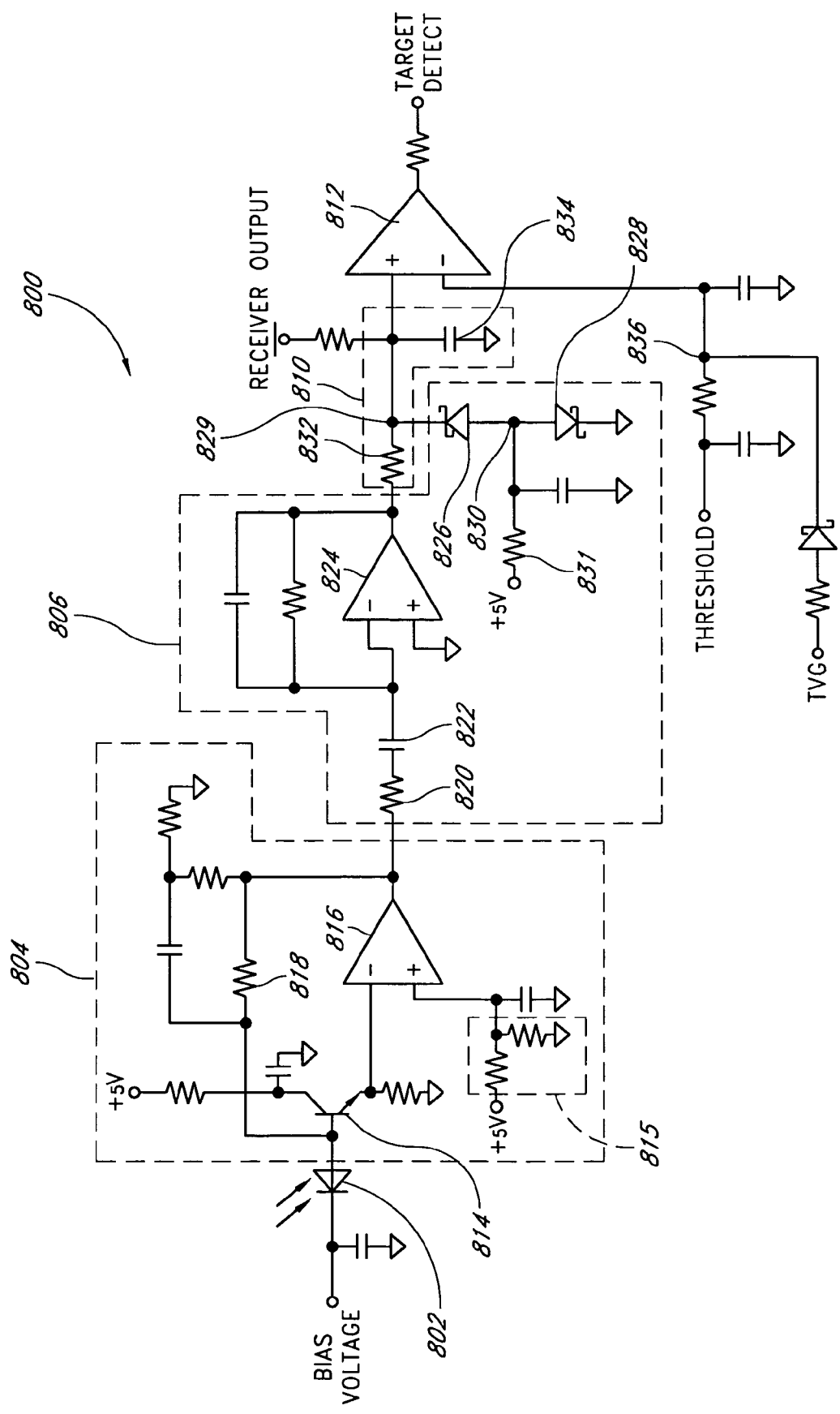
FIG. 8 is a schematic diagram of exemplary receiver circuitry according to an embodiment of the invention.

FIG. 8 is a schematic diagram of exemplary receiver circuitry 800 according to an embodiment of the invention. The exemplary receiver circuitry 800 includes a photodiode 802, a transimpedance amplifier section 804, a clamping amplifier section 806, a low-pass filter section 810, and a comparator 812. The photodiode 802 is configured to receive a laser pulse reflected from a target. In an embodiment, the laser pulse reflected from the target is less than approximately thirty nanoseconds wide. The cathode of the photodiode 802 is coupled to a "bias voltage" signal configured to bias the photodiode 802. Thus, upon receiving the reflected laser pulse, the photodiode 802 is configured to generate a current pulse proportional to the reflected laser pulse. The current pulse also includes noise that is inherent to the photodiode, caused by background light, or both.

The transimpedance amplifier section 804 is configured to receive the current pulse from the photodiode 802 and to generate an amplified voltage signal proportional thereto. The transimpedance amplifier section 804 includes a transistor 814, a first high-speed amplifier 816, and a feedback resistor 818. The gain or conversion factor of the transimpedance amplifier section 804 is a ratio of the voltage output by the first high-speed amplifier 816 and the current generated by the photodiode 802. Thus, the gain has units of volts per ampere, or ohms. The gain is determined at least in part by the feedback resistor 818 such that the voltage output by the high-speed amplifier 816 is approximately equal to the current generated by the photodiode 802 multiplied by the resistance of the feedback resistor 818.

The transistor 814 comprises a base coupled to the anode of the photodiode 802, a collector coupled to a +5 volt source, and an emitter coupled to ground. The emitter of the transistor 814 is also coupled to an inverting input of the first high-speed amplifier 816. Although the transistor 814 is shown as an NPN-type bipolar junction transistor (BJT), an artisan will recognize from the disclosure herein that other devices can be used including, for example, one or more PNP-type BJT, n-channel or p-channel metal-oxide field-effect transistor (MOSFET) or other types of field-effect transistors, combinations of the foregoing, or the like.

The transistor 814 is configured as a voltage buffer that matches the high impedance anode of the photodiode 802 to the low impedance inverting input of the first high-speed amplifier 816. In an embodiment, the bias current of the transistor 814 is set to a predetermined value so as to reduce the noise figure of the transistor 814. Manufactures of voltage buffer devices such as the transistor 814 typically provide information for using a bias current that reduces the noise figure. The feedback loop through the feedback resistor 818 is configured to equalize the inverting and non-inverting inputs of the first high-speed amplifier 816 by setting the bias current of the transistor 814. Thus, the positive input of the first high-speed amplifier 816 is coupled to a voltage divider circuit 815 configured to set the bias current of the transistor 814.

The first high-speed amplifier 816 outputs a voltage signal comprising a voltage pulse proportional to the current pulse generated by the photodiode. The voltage signal also comprises noise caused by background light received by the photodiode, noise generated by the photodiode, noise generated by the first high-speed amplifier 816, combinations of the foregoing, or the like.

The clamping amplifier section 806 includes a resistor 820 and a capacitor 822 configured as a high-pass filter that removes low frequency noise and constant voltage components from the voltage signal received from the first high-speed amplifier 816. The noise caused by the background light, for example, has a very broad spectrum of frequency components, a portion of which are removed by the high-pass filter comprising the resistor 820 and the capacitor 822. The high-pass filter also removes a constant voltage component at the output of the first high-speed amplifier 816 produced by the voltage buffer bias discussed above.

The clamping amplifier section 806 also includes a second high-speed amplifier 824 having an inverting input coupled to the capacitor 822. A non-inverting input of the second high-speed amplifier 824 is grounded. In an embodiment, one or both of the first high-speed amplifier 816 and the second high-speed amplifier 824 are 1.4 GHz EL5167 current feedback operational amplifiers commercially available from Intersil Americas Inc. However, an artisan will recognize from the disclosure herein that other high-speed, low-noise amplifiers having bandwidths suitable for amplifying pulse signals as described herein can be used.

The second high-speed amplifier 824 is configured to equalize its inverting and non-inverting inputs. Thus, by removing the constant voltage components from the voltage signal with the capacitor 822 and adjusting the inverting input of the second high-speed amplifier 824 relative to ground, the mean or average value of the noise present in the voltage signal is centered at approximately zero volts. The very short duration (e.g., approximately thirty nanoseconds) of the pulse present in the voltage signal and corresponding to the received laser pulse does not significantly effect the mean value of the voltage signal.

The pulse present in the voltage signal has a positive polarity. Thus, the pulse is greater than the mean value of the voltage signal, which is centered at approximately zero volts. Therefore, the negative portion of the voltage signal can be clamped or removed from the voltage signal without removing the pulse from the voltage signal. Since approximately half the noise present in the voltage signal is above zero volts and approximately half the noise is below zero volts, clamping the voltage signal at approximately zero volts effectively reduces the random noise present in the voltage signal by approximately half.

The clamping amplifier section 806 comprises a first diode 826 configured to remove approximately the negative portion of the voltage signal provided at the output of the second high-speed amplifier 824. The clamping amplifier section 806 further comprises a second diode 828 configured to bias the first diode 826. In an embodiment, the first diode 826 and the second diode are Schottky diodes. The cathode of the first diode 826 is coupled to a first node 829 and the anode of the first diode 826 is coupled to the anode of the second diode 828 at a second node 830. The cathode of the second diode 828 is coupled to ground.

When the negative-going portions of the voltage signal at the first node 829 go below the voltage level of the second node 830 by more than one diode voltage drop, the first diode 826 conducts current. Thus, the first diode 826 limits the negative-going portions of the voltage signal at the first node 829 to approximately one diode voltage drop below the voltage level at the second node 830. If, for example, the second node 830 were coupled directly to ground rather than the anode of the second diode 828, the voltage signal at the first node 829 would be limited to approximately one diode voltage drop below zero volts. In some embodiments, one diode voltage drop is approximately on the order of hundreds of millivolts. An artisan will recognize that this value will change depending on the particular diode used and factors such as the temperature or the like.

The second diode 828 is configured to bias the first diode 826 such that the first diode 826 limits the negative-going portions of the voltage signal at the first node 829 to substantially less than one diode voltage drop. The anode of the second diode 828 is coupled to a +5V signal through a resistor 831. The positive voltage on the anode of the second diode 828 causes the second diode 828 to conduct current and limit the voltage at the second node 830 to approximately one diode voltage drop above ground. Thus, the voltage signal at the first node 829 is limited to the voltage drop across the second diode 828 minus the voltage drop across the first diode 826. Preferably, the first diode and the second diode are located near one another so as to be at substantially the same temperature and thereby have substantially equal diode voltage drops. Thus, the negative-going portions of the voltage signal at the first node 829 can be removed or limited to within, for example, approximately tens of millivolts with respect to ground.

The low-pass filter section 810 comprises a resistor 832 and a capacitor 834 configured to remove high frequency noise components from the voltage signal. An artisan will recognize that the low-pass filter section 810 can be located before or after the clamping amplifier section 806 to reduce noise generated by background light, the photodiode 802, the transimpedance amplifier section 804, or the like. However, the low-pass filter section 810 is preferably placed after the clamping amplifier section 806 to also reduce noise generated by the clamping amplifier section 806. At least a portion of the noise amplified by the clamping amplifier section 806 is in the form of short duration pulses that are substantially less than thirty nanoseconds wide. The low-pass filter section 810 reduces the amplitude of these short duration pulses without significantly reducing the approximately thirty nanosecond wide pulse present in the voltage signal corresponding to the received laser pulse.

A positive terminal of the comparator 812 is configured to receive the voltage signal from the low-pass filter section 810. The voltage signal from the low-pass filter section 810 is also provided as a "receiver output" signal that indicates the strength of the received beam. The receiver output signal may, for example, be displayed to a user, stored, transmitted to an external device or system, processed, combinations of the foregoing, or the like. A negative terminal of the comparator 812 is configured to receive a "threshold" signal. The comparator 812 is configured to generate a "target detect" signal when the voltage signal on its positive terminal is greater than or equal to the threshold signal on its negative terminal. Thus, a valid beam is detected when the pulse that is proportional to the magnitude of the received beam reaches or exceeds the threshold signal.

When the pulse present in the voltage signal corresponding to the received laser pulse is near the noise level, the random noise present in the voltage signal tends to incorrectly cause the voltage signal to exceed the threshold signal and falsely generate the target detect signal. To reduce false detections, a time-varying gain signal (hereinafter, "TVG signal") is superimposed on the threshold signal at a node 836 and provided to the negative terminal of the comparator 812. By setting the threshold signal level and superimposing the TVG signal that changes as a function of time, the sensitivity of the receiver 800 is increased as a function of time to detect weaker signals that travel greater distances to reach the receiver.

Figure 9:
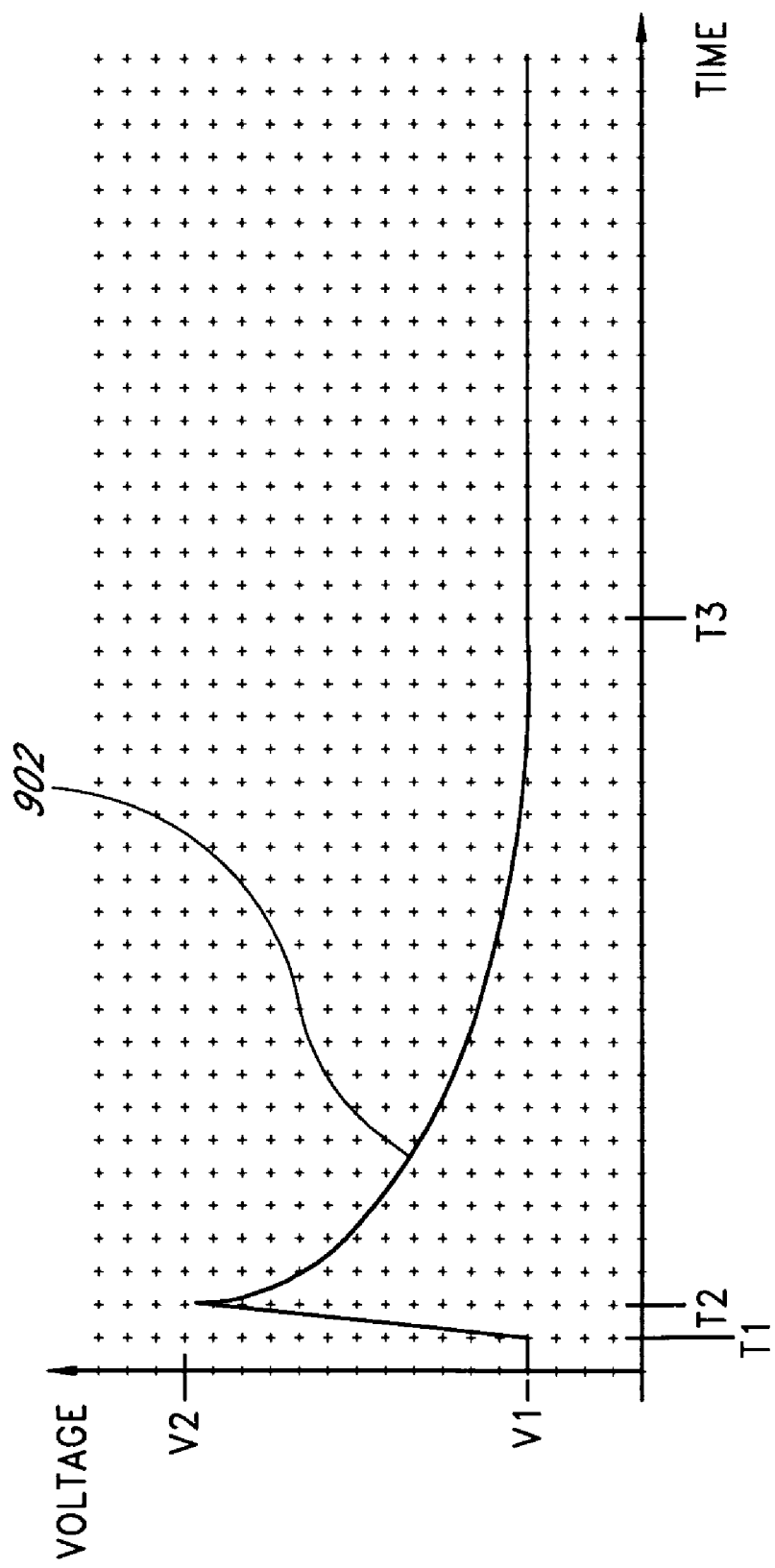
FIG. 9 is an exemplary graphical representation illustrating a voltage waveform compared to a received signal from a target according to an embodiment of the invention.

FIG. 9 illustrates an exemplary voltage waveform 902 provided at the negative input of the comparator 812 according to an embodiment of the invention. Before a first time T1, the voltage waveform 902 is set at a first voltage level V1. The first voltage level V1 corresponds to the level of the threshold signal shown in FIG. 8 and is set slightly above the noise level of the receiver 800. At the first time T1, a laser pulse is emitted and the TVG signal is superimposed on the threshold signal to change the voltage waveform 902 to a second voltage level V2 at a second time T2. With the second voltage level V2 provided at the negative input of the comparator 812, the receiver 800 will ignore weak reflections from nearby objects that are not the intended target. However, the comparator 812 will generate the target detect signal when laser pulses from nearby targets produce voltage signals in the receiver 800 greater than the second voltage level V2.

As discussed above, weaker reflections are received from targets that are further away. Thus, the TVG signal exponentially decreases and, thereby, causes the voltage waveform 902 to automatically exponentially decrease from the second voltage level V2 towards the first voltage level V1. In an embodiment, the voltage waveform 902 decreases from the second voltage level V2 at the second time T2 to substantially the first voltage level V1 at a third time T3 in approximately two microseconds. This two microsecond elapsed time between the second time T2 and the third time T3 is given by way of example only and an artisan will recognize from the disclosure herein that the sensitivity of the receiver 800 can be adjusted using a wide range of time intervals. Further, rather than decrease the TVG signal exponentially, an artisan will recognize that the TVG signal can be decreased in other manners including, for example, linearly, geometrically, in discrete steps, combinations of the foregoing, or the like.

Based on the foregoing, superimposing the TVG signal on the target detect threshold signal changes the sensitivity of the receiver as a function of time. Thus, the sensitivity can be advantageously increased to thereby detect increasingly weaker signals from, for example, more distant targets. While providing the voltage waveform 902 to the negative input of the comparator 812 reduces the sensitivity of the receiver 800 for nearby targets (e.g., within approximately 1000 feet), nearby targets generally provide strong reflection signals to the receiver 800. Further, the time-varying change to the voltage waveform 902 advantageously reduces the tendency for noise to produce falsely generated target detect signals when measuring the range to a target.

Figure 10:
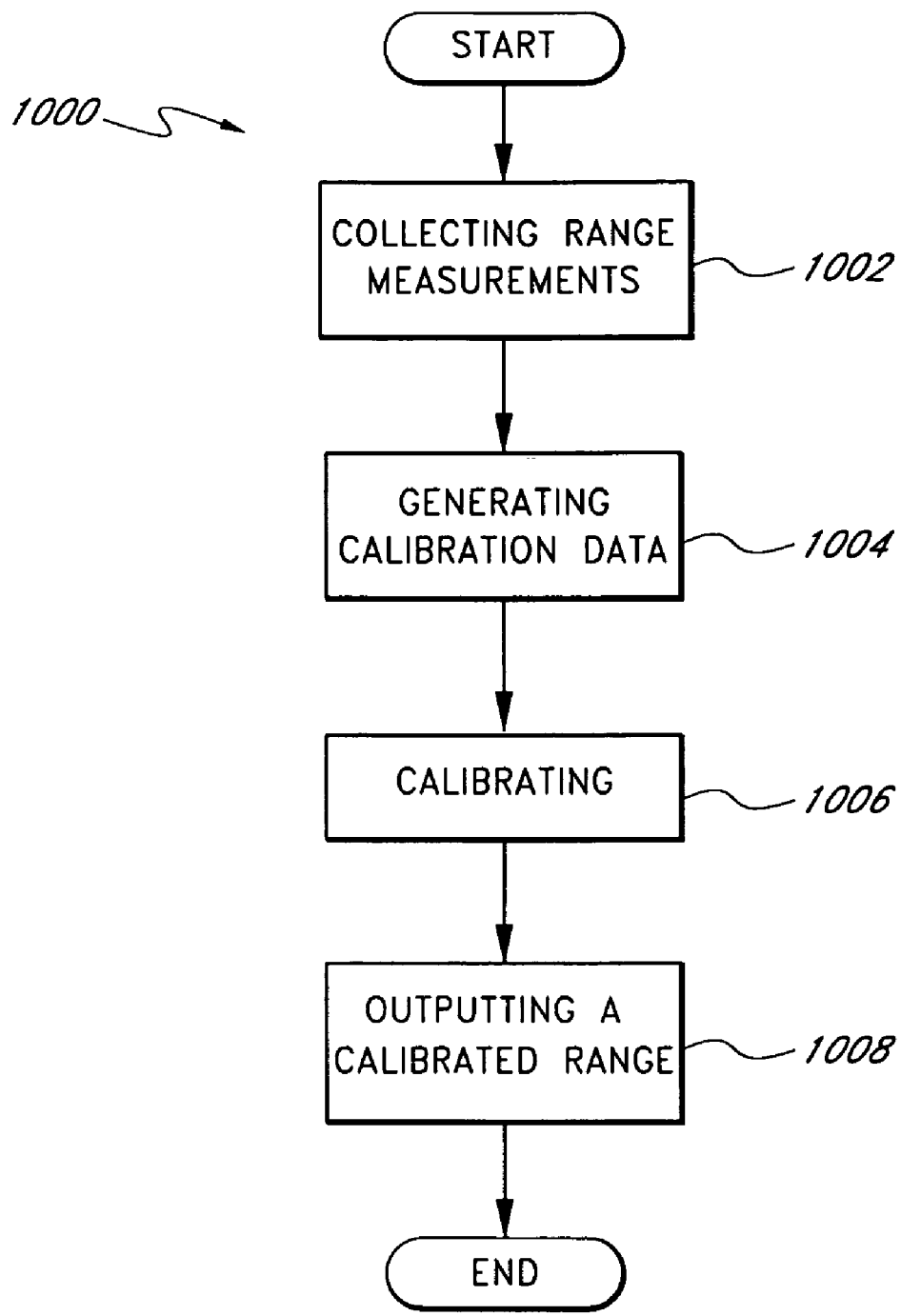
FIG. 10 is a flowchart of an exemplary data collection process usable by the rangefinder system of FIG. 4.

FIG. 10 illustrates an exemplary data collection process 1000 usable by a rangefinder, such as the rangefinder system 400 of FIG. 4. The collection process 1000 comprises, in short, collecting range measurements, generating calibration data, calibrating, and outputting a calibrated range. Thus, calibration data is generated each time range measurements are collected. This allows the calibration data to account for range measurement errors that vary with time or environmental conditions.

Referring to FIG. 10 at block 1002, a rangefinder 400 collects range measurements. In an embodiment, range measurements are collected by measuring the flight time of transmitted and reflected energy or light beams. The measured flight time and speed of the beam is used to calculate a distance from the rangefinder 400 to a target.

At block 1004, the rangefinder 400 generates calibration data. The calibration data is proportional to an error in the collected range measurements. The error may, for example, be related to dynamic factors or inherent delays in the circuitry of the rangefinder 400. In an embodiment, the calibration data is automatically generated after the rangefinder 400 collects a range measurement. Alternatively, the calibration data is automatically generated before the rangefinder 400 collects a range measurement. Preferably, the calibration data is generated within a period of time before or after the range measurement is collected so as to provide a measurement of errors related to dynamic factors, such as errors that vary with time or environmental conditions.

In an embodiment, the rangefinder 400 generates calibration data by simulating one or more range measurements. Range measurements may be simulated, for example, by measuring a predetermined calibration time and comparing the measured flight time with the predetermined calibration time to determine an error. In an embodiment, two or more range measurements are simulated to determine an error relationship between flight times and target ranges.

At block 1006, the rangefinder 400 calibrates the collected range measurements by correcting for the error proportional to the calibration data. At block 1008, the rangefinder 400 outputs the calibrated range. The calibrated range may be output, for example, by communicating the calibrated range value to a display device, an external memory device, a communication device, or the like.

Figure 11A:
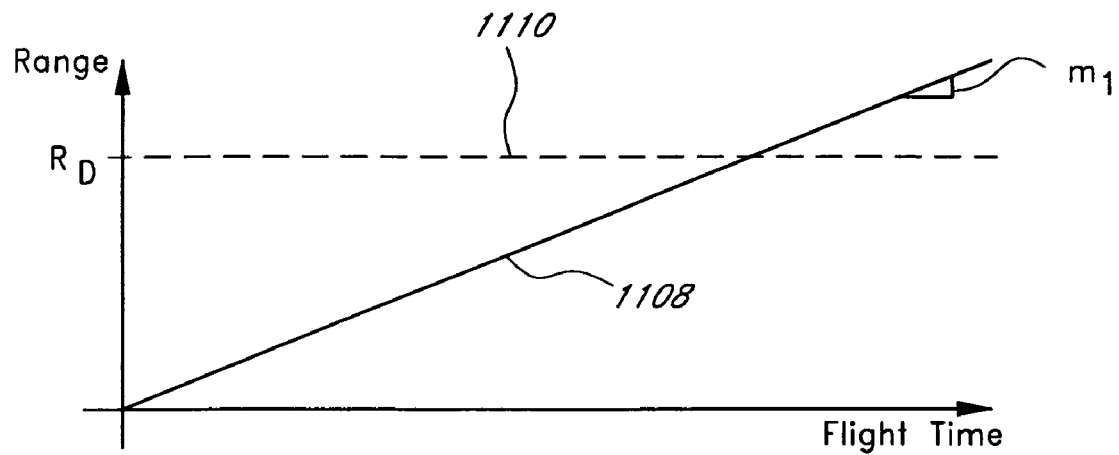
FIGS. 11A and 11B are exemplary graphical representations illustrating a target range versus a flight time of a laser beam.
Figure 11B:
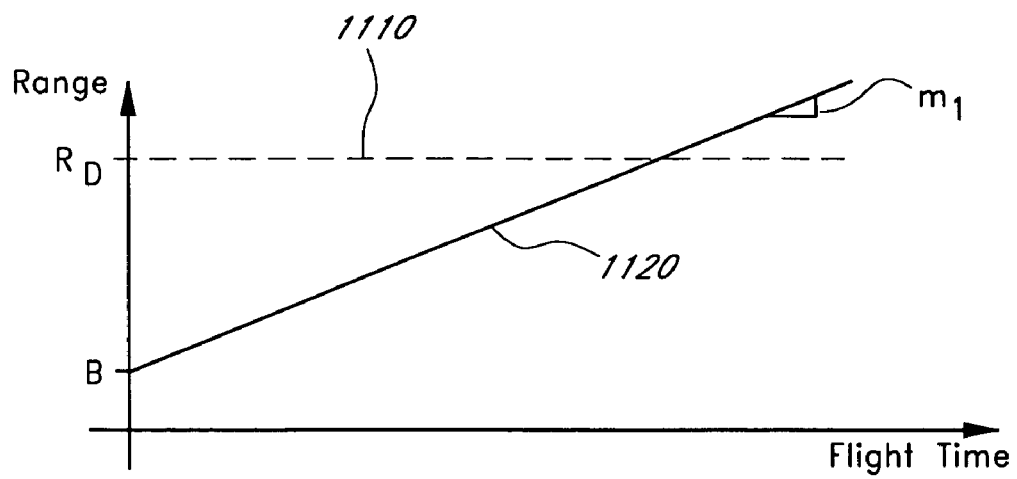

FIGS. 11A and 11B are exemplary graphical representations illustrating a target range versus a flight time of a laser beam. Referring to FIG. 11A, line 1108 has a slope $m_1$ and illustrates a linear relationship between an actual range and an actual flight time. Thus, line 1108 represents a situation in which a rangefinder system has no errors in measuring a flight time. The slope $m_1$ is dependent upon the speed of the laser pulse. In the example discussed in relation to equation (1) above, the range to a target equals about 0.49178 feet per nanosecond multiplied by the flight time in nanoseconds. Thus, for that example, the slope $m_1$ equals 0.49178 feet per nanosecond.

The dashed line 1110 corresponds to an uncalibrated range measurement $R_D$. If there were no errors in the rangefinder system, the actual flight time would correspond to the intersection of line 1108 and the dashed line 1110. However, in the presence of timing errors, the relationship between the uncalibrated range measurement $R_D$ and line 1108 is unknown because the actual flight time corresponding to the uncalibrated range measurement $R_D$ is uncertain.

Referring to FIG. 11B, line 1120 illustrates a linear relationship between a range to a target and a flight time in the presence of errors caused by inherent delays in internal rangefinder electronics. For example, a transmitter and a receiver contribute a small amount of delay to the round trip flight time measurement. Further, the rise time of the receiver output signal is a function of the strength of the reflected laser pulse signal at the receiver. To calibrate for these propagation delays, line 1120 is shifted by a range calibration value B while maintaining the same slope $m_1$ as line 1108 in FIG. 11A.

In one embodiment, the range calibration value B equals a first memory constant B1 (not shown) when the reflected laser pulse signal at the receiver is relatively strong compared to a maximum receiver signal. Similarly, the range calibration value B equals a second memory constant B2 (not shown) when the reflected laser pulse signal at the receiver is relatively weak compared to the maximum receiver signal.

In one embodiment, the first memory constant B1 and the second memory constant B2 are generated during factory calibration and alignment of the rangefinder and are stored, for example, in electronically accessible medium, such as a nonvolatile memory within the rangefinder. For example, the user input device 432 or the communication device 436 shown in FIG. 4 may be used to store the first memory constant B1 and the second memory constant B2 in the memory device 420 of the rangefinder system 400.

In one embodiment, the range calibration value B is selected from a range of values based upon the received signal strength. In an exemplary embodiment, the range of values includes a linear relationship between the first memory constant B1 and the second memory constant B2 proportional to the received signal strength. Thus, the range calibration value B is selected as a function of the received signal strength.

The dashed line 1110 in FIG. 11B again corresponds to an uncalibrated range measurement $R_D$. If propagation delays corresponding to the range calibration value B were the only errors in the timing measurement, the actual flight time would correspond to the intersection of line 1120 and the dashed line 1110. However, in the presence of timing errors that vary with time or environmental conditions, the relationship between the uncalibrated range measurement $R_D$ and line 1120 is unknown because the actual flight time corresponding to the uncalibrated range measurement $R_D$ is uncertain.

Figure 12A:
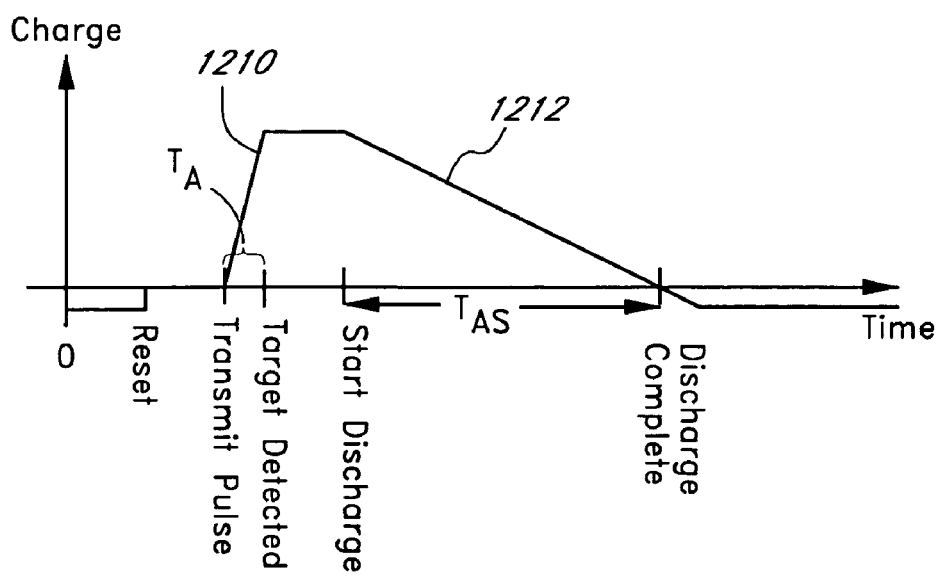
FIGS. 12A and 12B are exemplary graphical representations illustrating charge in a capacitor during first and second calibration measurements.
Figure 12B:
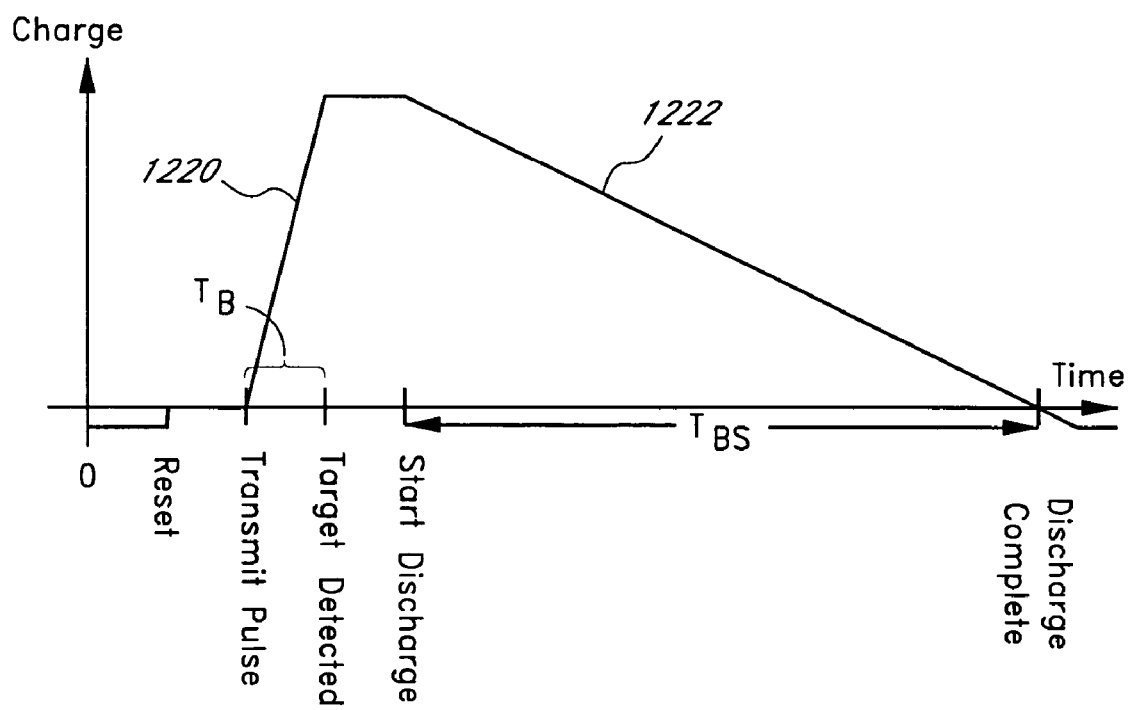

FIGS. 12A and 12B are exemplary graphical representations illustrating charge in a capacitor during first and second calibration measurements. Referring to FIGS. 5, 12A and 12B, the timing circuitry 440 operates in a calibration mode. In an embodiment, two calibration measurements are performed. FIG. 12A illustrates the charge on the capacitor 516 as a function of time during a first calibration measurement and FIG. 12B illustrates the charge on the capacitor 516 as a function of time during a second calibration measurement. The first calibration measurement is initialized or "Reset" by disabling the receiver and removing any charge in the capacitor 516 by opening switches 510 and 514 and closing switch 512. Calibration time generation is started by opening switch 512, transmitting a laser pulse and closing switch 510. With switch 510 closed, the current source 522 begins to charge the capacitor 516 as indicated by line 1210 in FIG. 12A.

At a predetermined first calibration time $T_A$ after transmitting the laser pulse, switch 510 is opened to stop the charging of the capacitor 516. The charge in the capacitor 516 is held until a first simulated flight time $T_{AS}$ measurement is determined by measuring the time required to discharge the capacitor 516. Switch 514 is closed to start discharging the capacitor 516 through the current sink 524 as indicated by line 1212. When the charge on the discharging capacitor 516 is equal to or less than circuit ground 520, the discharge is complete and the comparator 518 provides a Ramp_Zero signal. In response to the Ramp_Zero signal, switch 514 is opened and the first simulated flight time $T_{AS}$ measurement is recorded. As discussed above with respect to equation (1), the first simulated flight time $T_{AS}$ can be converted to a first simulated range $R_A$ (not shown).

The second calibration measurement is initialized or "Reset" by disabling the receiver and removing any charge on the capacitor 516 by opening switches 510 and 514 and closing switch 512. Calibration time generation is started by opening switch 512, transmitting a laser pulse and closing switch 510. With switch 510 closed, the current source 522 begins to charge the capacitor 516 as indicated by line 1220 in FIG. 12B.

At a predetermined second calibration time $T_B$ after transmitting the laser pulse, switch 510 is opened to stop the charging of the capacitor 516. The charge in the capacitor 516 is held until a second simulated flight time $T_{BS}$ measurement is determined by measuring the time required to discharge the capacitor 516. Switch 514 is closed to start discharging the capacitor 516 through the current sink 524 as indicated by line 1222. When the charge on the discharging capacitor 516 is equal to or less than circuit ground 520, the discharge is complete and the comparator 518 provides a Ramp_Zero signal. In response to the Ramp_Zero signal, switch 514 is opened and the second simulated flight time $T_{BS}$ measurement is recorded. As discussed above with respect to equation (1), the second simulated flight time $T_{BS}$ can be converted to a second simulated range $R_B$ (not shown).

Figure 13A:
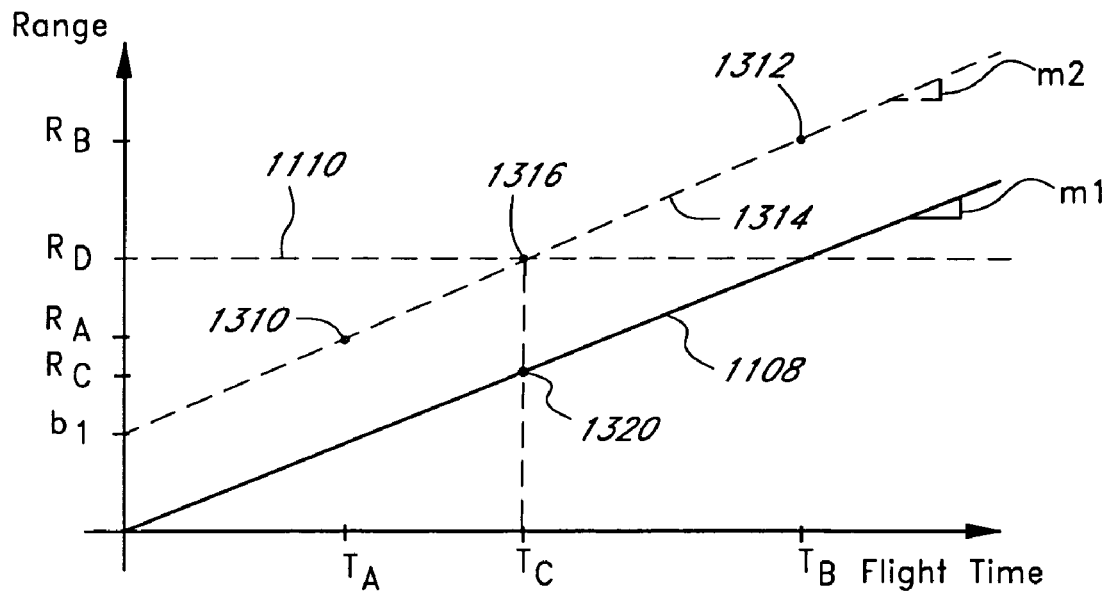
FIGS. 13A and 13B are exemplary graphical representations illustrating a target range versus a flight time of a laser beam, an uncalibrated range measurement, a first simulated range measurement, and a second simulated range measurement.
Figure 13B:
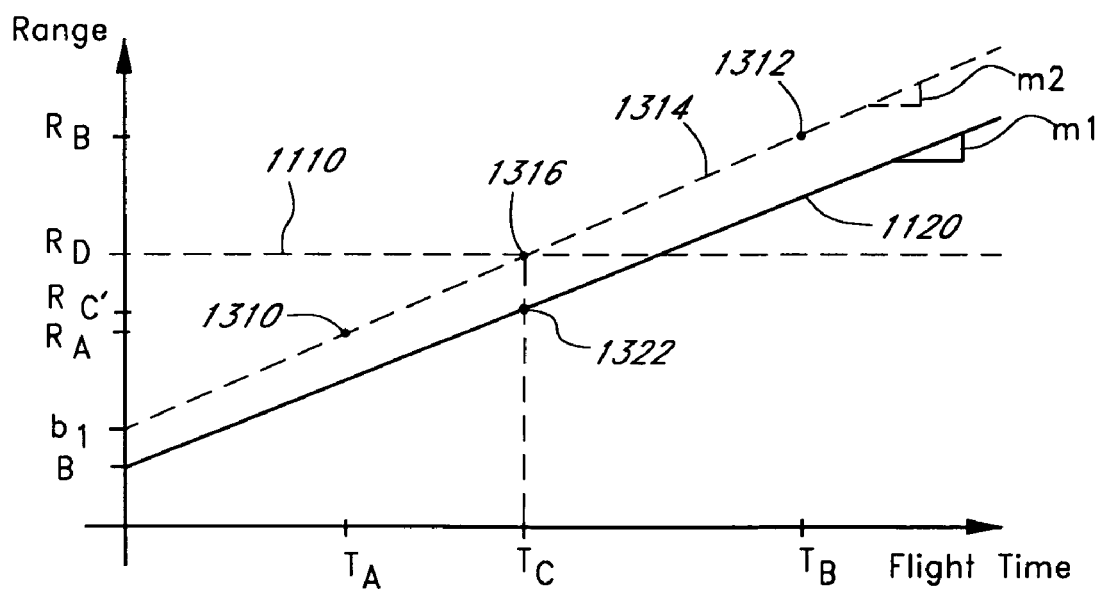

FIGS. 13A and 13B are exemplary graphical representations illustrating a target range versus a flight time of a laser beam, an uncalibrated range measurement, a first simulated range measurement, and a second simulated range measurement. FIG. 13A illustrates line 1108 and line 1110 of FIG. 11A with slope $m_1$ and representing the linear relationship between an actual range and an actual flight time, and the uncalibrated range measurement $R_D$, respectively. FIG. 13A also illustrates a first calibration point 1310 and a second calibration point 1312 defining a calibration line 1314 having the form of a linear equation:

$$y = mx + b \quad (2),$$

where y corresponds to the Range axis, m is the slope $m_2$ of the calibration line 1314, x corresponds to the Flight Time axis, and b corresponds to the interception of the calibration line 1314 with the Range axis at $b_1$.

The first calibration point 1310 corresponds to the first simulated range $R_A$ and the predetermined first calibration time $T_A$. The second calibration point 1312 corresponds to the second simulated range $R_B$ and the predetermined second calibration time $T_B$. Thus, the slope $m_2$ of line 1314 is defined by:

$$m_2 = (R_B - R_A)/(T_B - T_A) \quad (3).$$

Having defined the calibration line 1314, uncalibrated data point 1316 corresponding to uncalibrated range measurement $R_D$ is defined by the interception of line 1110 and calibration line 1314. The interception of line 1110 and calibration line 1314 is found by solving equation (2) for x corresponding to a calibrated flight time $T_C$. Thus, the calibrated flight time $T_C$ is given by:

$$T_C = (R_D - b_1)/m_2 \quad (4).$$

Once the calibrated flight time $T_C$ is known, the uncalibrated data point 1316 is correlated to a calibrated data point 1320 along line 1108 at the calibrated flight time $T_C$. The calibrated data point 1320 corresponds to a calibrated range $R_C$ which is determined by solving equation (2) where y is the calibrated range $R_C$, m is slope m1, x is the calibrated flight time $T_C$ defined by equation (4), and b is zero. Thus, the calibrated range $R_C$ is given by:

$$R_C = m_1(T_C) + 0 = m_1(R_D - b_1)/m_2 \quad (5).$$

In the example discussed in relation to equation (1) above, the range to a target equals 0.49178 feet per nanosecond multiplied by the flight time in nanoseconds. Thus, for that example, the slope $m_1$ equals 0.49178 feet per nanosecond. Substituting this value for $m_1$ and equation (3) for $m_2$ in equation (5) gives:

$$R_C = (R_D - b_1)(0.49178/m_2) = (R_D - b_1)(0.49178/(R_B - R_A))(T_B - T_A) \quad (6).$$

FIG. 13B illustrates line 1120 and line 1110 of FIG. 13B in relation to the first calibration point 1310 and the second calibration point 1312 shown in FIG. 13A. As discussed above, line 1120 illustrates a linear relationship between a range to a target and a flight time in the presence of errors caused by delays in internal rangefinder electronics. Line 1120 is shifted by a range calibration value B while maintaining slope $m_1$. The calibration line 1314, slope $m_2$, uncalibrated data point 1316, and calibrated flight time are each determined as described above.

In FIG. 13B, the uncalibrated data point 1316 is correlated to a calibrated data point 1322 along line 1120 at the calibrated flight time $T_C$. The calibrated data point 1322 corresponds to a calibrated range $R_C'$ which is determined by solving equation (2) where y is the calibrated range $R_C'$, m is slope $m_1$, x is the calibrated flight time $T_C$ defined by equation (4), and b is B. Thus, the calibrated range $R_C'$ is given by:

$$R_C' = (m_1(T_C)) + B = (m_1(R_D - b_1)/m_2) + B \quad (7).$$

In the example discussed in relation to equation (1) above, the slope $m_1$ equals 0.49178 feet per nanosecond. Substituting this value for m1 and equation (3) for $m_2$ in equation (7) gives:

$$R_C' = ((R_D - b_1)(0.49178/(R_B - R_A))(T_B - T_A)) + B \quad (8).$$

Therefore, by generating at least two simulated calibration measurements for each range measurement or group of range measurements, time-varying range measurement errors can be corrected by using equation (6). Further, time-varying range measurement errors and errors due to a transmitter, receiver and receiver signal strength can be corrected by using equation (8).

Although the present invention has been described with reference to specific embodiments, other embodiments will occur to those skilled in the art. For example, timing circuitry, such as the timing circuitry 440 shown in FIG. 4, may comprise a high speed counter (not shown) driven by a time base (not shown) such as an oscillator. In an embodiment, the high speed counter is configured to accumulate counts from the time base when a beam is emitted and to stop accumulating counts from the time base when a beam is detected. Thus, the flight time of an emitted and reflected beam is proportional to the counts accumulated by the high speed counter. In such an embodiment, calibration is provided by accounting for inherent delays in internal rangefinder electronics such as discrete component delays in the transmitter and receiver as well as delays caused by the rise time of the receiver output signal as a function of the strength of the received signal.

For example, taking the distance traveled by the transmitted and reflected beams at an exemplary speed to be about 6.1002 nanoseconds per yard and the high speed counter to accumulate counts at an exemplary count of about 6.25 nanoseconds per count, the range to the target may be calculated as:

$$\text{Range (yards)} = (((6.25/6.1002) \times \text{raw range count}) + B) \quad (9),$$

where 6.25 nanoseconds per count and 6.1002 nanoseconds per yard are provided for exemplary reasons only and are not intended to limit or construe the disclosure or claims. The "raw range count" is the count accumulated by the high speed counter while measuring the flight time of the transmitted and reflected beams.

The "B" term in equation (9) represents a range calibration value. In an embodiment, the range calibration value B equals a first memory constant when the reflected beam signal is relatively strong compared to a maximum receiver signal. Similarly, the range calibration value B equals a second memory constant when the reflected beam signal is relatively weak compared to the maximum receiver signal. In an embodiment, the range calibration value B is selected from a range of values between the first memory constant and the second memory constant so as to be proportional to the strength of the reflected beam signal. In an embodiment, the first memory constant and the second memory constant are generated during factory calibration and alignment of the rangefinder and are stored, for example, in electronically accessible medium, such as a nonvolatile memory within the rangefinder.

It is to be understood that the embodiments described above have been presented by way of example, and not limitation. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A rangefinder configured to determine a range to a target by measuring a flight time of a beam traveling between the rangefinder and the target, the rangefinder comprising:
    a transmitter configured to emit the beam towards the target;
    a receiver configured to detect a reflection of the beam from the target, the receiver comprising:
        a photodiode configured to generate a current signal proportional to the received reflection;
        a transimpedance amplifier configured to receive the current signal and to generate a voltage signal proportional thereto;
        noise reduction circuitry configured to reduce noise present in the voltage signal by limiting the voltage signal relative to a first voltage level, the first voltage level selected according to a methodology of reducing said noise in said voltage signal;
        a comparator configured to indicate when the noise-reduced voltage signal exceeds a second voltage level, the second voltage level selected above an expected noise in the noise-reduced voltage signal, thereby confirming that when said noise-reduced voltage signal exceeds said second voltage level, said received reflection comprises a desired reflection;
        one or more filters configured to remove noise components from the voltage signal; and
        an amplifier configured to amplify the voltage signal, wherein the amplifier is further configured to set a mean value of the voltage signal to the first voltage level; and
    a processor configured to convert the flight time of the beam into a range measurement when the comparator indicates the noise-reduced voltage signal has exceeded the second voltage level.

2. The rangefinder of claim 1, wherein the noise reduction circuitry is configured to remove portions of the voltage signal below the first voltage level.

3. The rangefinder of claim 2, wherein the first voltage level comprises substantially zero volts.

4. The rangefinder of claim 1, wherein the one or more filters comprise a first filter coupled between the transimpedance amplifier and the amplifier, the first filter configured to remove low frequency noise components from the voltage signal.

5. The rangefinder of claim 4, wherein the one or more filters further comprise a second filter coupled between the noise reduction circuitry and the comparator, wherein the second filter is configured to remove high-frequency noise components from the voltage signal.

6. The rangefinder of claim 1, further comprising timing circuitry configured to measure the flight time between the emission of the beam by the transmitter and the detection of the beam by the receiver.

7. The rangefinder of claim 6, wherein the timing circuitry comprises a capacitor configured to charge at a first rate when the transmitter emits the beam and to discharge at a second rate in response to the reflected beam detected by the receiver.

8. The rangefinder of claim 7, wherein the timing circuitry further comprises a timing comparator configured to indicate when the capacitor is discharged.

9. The rangefinder of claim 7, wherein the timing circuitry further comprises a counter configured to measure a discharge time of the capacitor.

10. The rangefinder of claim 1, wherein the noise reduction circuitry comprises clamping circuitry and is further configured to substantially reduce about half the noise present in the voltage signal.

11. The rangefinder of claim 1, wherein the second voltage level is configured to decrease as a function of time.

12. The rangefinder of claim 11, wherein the second voltage level is configured to decrease exponentially.

13. A method for detecting a reflected beam received from a target, the method comprising:
    generating a voltage signal proportional to the reflected beam;
    amplifying the voltage signal;
    removing a first portion of noise from the voltage signal;
    comparing the voltage signal to a first voltage level to detect the reflected beam, wherein the first voltage level is above a second portion of the noise present in the voltage signal; and
    indicating that the voltage signal is at least as great as the first voltage level,
    wherein removing the first portion of noise comprises filtering low frequency noise components from the voltage signal, wherein amplifying the voltage signal comprises setting the mean value of the voltage signal to a second voltage level, and
    wherein removing the first portion of noise comprises clamping the voltage signal at the second voltage level.

14. The method of claim 13, wherein setting the mean value of the voltage signal to the second voltage level comprises adjusting the mean value to approximately zero volts.

15. The method of claim 13, further comprising filtering high frequency noise components from the voltage signal after the amplifying.

16. The method of claim 13, wherein generating the voltage signal comprises:
    receiving the reflected beam;
    converting the reflected beam into a current signal;
    buffering the current signal; and
    converting the current signal into the voltage signal.

17. A rangefinder receiver comprising:
    means for generating a voltage signal proportional to a beam reflected from a target;

means for removing noise from the voltage signal; and means for comparing the voltage signal to a first voltage level, the first voltage level selected above an expected noise in the voltage signal, thereby confirming that when said voltage signal exceeds said first voltage level, said receiver has received a desired reflection, wherein the means for removing noise comprises means for limiting the voltage signal to a second voltage level to thereby remove a portion of noise present in the voltage signal, the second voltage level selected according to a methodology of reducing said noise in said voltage signal, and wherein the means for limiting the voltage signal comprises:
  means for removing high frequency noise components from the voltage signal;
  means for amplifying the voltage signal and substantially centering the voltage signal with respect to the second voltage level; and
  means for clamping the voltage signal at the second voltage level.

18. The rangefinder receiver of claim 17, further comprising means for removing low frequency noise components from the voltage signal.

19. A receiver comprising:
  a photodiode configured to generate a current signal proportional to a received light pulse;
  a transimpedance amplifier configured to receive the current signal and to generate a voltage signal proportional thereto, wherein the voltage signal comprises noise and a voltage pulse proportional to the light pulse;
  noise reduction circuitry configured to remove noise present in the voltage signal, wherein the noise reduction circuitry comprises circuitry configured to clamp the voltage signal; and
  a threshold that is adjustable in a search pattern, wherein the circuitry configured to clamp the voltage signal comprises:
    a high-pass filter;
    an amplifier coupled to the high-pass filter, wherein the high-pass filter and the amplifier are configured to adjust the mean value of the voltage signal;
    a first diode configured to remove portions of the voltage signal below the mean value; and
    a second diode configured to bias the first diode.

20. The receiver of claim 19, further comprising a low-pass filter.

* * * * *